(12) United States Patent
Kusukame et al.

(10) Patent No.: US 8,199,396 B2
(45) Date of Patent: Jun. 12, 2012

(54) LASER LIGHT SOURCE, AND IMAGE DISPLAY APPARATUS AND PROCESSING APPARATUS USING THE SAME

(75) Inventors: Koichi Kusukame, Osaka (JP); Hiroyuki Furuya, Osaka (JP); Tetsuro Mizushima, Hyogo (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/528,553

(22) PCT Filed: Dec. 24, 2008

(86) PCT No.: PCT/JP2008/003919
§ 371 (c)(1),
(2), (4) Date: Aug. 25, 2009

(87) PCT Pub. No.: WO2009/081577
PCT Pub. Date: Jul. 2, 2009

(65) Prior Publication Data
US 2010/0110533 A1 May 6, 2010

(30) Foreign Application Priority Data

Dec. 26, 2007 (JP) .................................. 2007-333771

(51) Int. Cl.
*H01S 3/04* (2006.01)
*H01S 3/10* (2006.01)
*G02F 1/35* (2006.01)

(52) U.S. Cl. ............. 359/328; 359/326; 372/22; 372/34

(58) Field of Classification Search .......... 359/326–332; 372/21, 22, 34, 105
See application file for complete search history.

(56) References Cited

U.S. PATENT DOCUMENTS 3,858,056 A * 12/1974 Melamed et al. ............. 359/326
5,093,832 A * 3/1992 Bethune et al. ................. 372/21
5,353,292 A * 10/1994 Motegi ............................ 372/21
(Continued)

FOREIGN PATENT DOCUMENTS
CN 1481289 3/2004
(Continued)

OTHER PUBLICATIONS

International Search Report issued Feb. 24, 2009 in International (PCT) Application No. PCT/JP2008/003919, filed Dec. 24, 2008.

(Continued)

*Primary Examiner* — Daniel Petkovsek
(74) *Attorney, Agent, or Firm* — Wenderoth Lind & Ponack, L.L.P.

(57) ABSTRACT

A laser light source includes a semiconductor laser, a wavelength converting element made of a non-linear optical crystal for converting excitation light from the semiconductor laser into wavelength converted light having a wavelength different from the wavelength of the excitation light, a photodiode for measuring a part of the wavelength converted light to be emitted from the wavelength converting element as output light, a photodiode for measuring the excitation light to be emitted from the wavelength converting element, and a control circuit, wherein the control circuit simultaneously performs an output constant control of making the intensity of the wavelength converted light constant, using a current driving circuit, and a temperature control of adjusting the temperature of the wavelength converting element, using a heater.

16 Claims, 20 Drawing Sheets

U.S. PATENT DOCUMENTS

| | | | |
|---|---|---|---|
| 5,671,232 A * | 9/1997 | Lee et al. | 372/22 |
| 5,854,870 A | 12/1998 | Helmfrid et al. | |
| 6,130,901 A * | 10/2000 | Takamine et al. | 372/32 |
| 7,133,428 B2 * | 11/2006 | Kitaoka et al. | 372/38.02 |
| 7,242,700 B2 * | 7/2007 | Wang | 372/22 |
| 2004/0084607 A1 | 5/2004 | Ichihashi et al. | |
| 2007/0273849 A1 | 11/2007 | Takeda | |

FOREIGN PATENT DOCUMENTS

| | | |
|---|---|---|
| CN | 101051179 | 10/2007 |
| JP | 5-249521 | 9/1993 |
| JP | 2003-121895 | 4/2003 |
| JP | 2003-174222 | 6/2003 |
| JP | 2006-19603 | 1/2006 |
| JP | 2007-233039 | 9/2007 |

OTHER PUBLICATIONS

I.D. Lindsay et al., "Doubly resonant cw PPLN optical parametric oscillator pumped by injection-locked broad-area diode laser", CLEO '98, 1998, p. 43.

* cited by examiner

LASER LIGHT SOURCE, AND IMAGE DISPLAY APPARATUS AND PROCESSING APPARATUS USING THE SAME

BACKGROUND OF THE INVENTION

1. Technical Field

The present invention relates to a laser light source including a wavelength converting element for performing wavelength conversion utilizing a non-linear optical effect, and a method for controlling the laser light source, and also relates to an image display apparatus and a processing apparatus incorporated with the laser light source.

2. Background Art

Laser light is used in various fields such as measuring apparatuses, medical apparatuses, processing apparatuses, and display apparatuses, not to mention communications apparatus and optical recording apparatuses. A semiconductor laser is used as a primary light source in these fields in view of control feasibility and its small size.

Among the above light sources, a semiconductor laser for stably generating light of a wavelength in a visible region from 0.5 µm to 0.6 µm has not been realized. A semiconductor laser for generating light of a wavelength in a mid infrared region of 2 µm or more is required to be cooled in a temperature zone from −100° C. to −200° C., and continuous oscillation of the semiconductor laser in a room temperature is difficult.

In view of the above, there is widely used a wavelength conversion technique, wherein light to be emitted from a semiconductor laser, a fiber laser excited by a semiconductor laser, or a like device is used as excitation light, and the excitation light is subjected to wavelength conversion by a wavelength converting element made of a non-linear optical crystal to generate light of a wavelength in a visible region or a mid infrared region. Propagation of excitation light in the wavelength converting element converts the energy of the excitation light into the energy of wavelength converted light. Extending the interaction length between the excitation light and the wavelength converting element increases the conversion amount into the wavelength converted light.

However, since the wavelength of excitation light and the wavelength of wavelength converted light are different from each other in wavelength conversion using a non-linear optical crystal, the refractive indexes of the excitation light and the wavelength converted light are greatly different from each other. For instance, in the case where lithium niobate ($LiNbO_3$) as a representative non-linear optical crystal material is used as a material for a wavelength converting element, and green laser light (wavelength converted light of 532 nm wavelength) to be used in a display light source is obtained by incidence of excitation light of 1064 nm wavelength, the refractive indexes of the excitation light and the wavelength converted light are respectively 2.15600 and 2.23389 at e.g. 40° C., respectively. The phases of the excitation light and the wavelength converted light are gradually displaced from each other in the wavelength converting element, as the difference in refractive index between the excitation light and the wavelength converted light is increased. As a result, wavelength conversion cannot be performed efficiently.

In view of the above, conventionally, there are proposed, as methods for correcting a difference in refractive index between excitation light and wavelength converted light, quasi phase matching, wherein a non-linear optical crystal having a cyclic polarization inversion structure is used as a wavelength converting element, and birefringent phase matching, wherein wavelength converted light having the polarization which is different from excitation light, is generated. Use of these methods enables to match the phases between excitation light and wavelength converted light, or make the phases constant in an analogous manner at a certain temperature.

The refractive indexes 2.15600 and 2.23389 of excitation light and wavelength converted light at 40° C. are changed to 2.15642 and 2.23447 at e.g. 50° C., respectively. Accordingly, in any case, stable wavelength conversion cannot be performed, unless the temperature of the wavelength converting element is stabilized. In other words, it is necessary to perform wavelength conversion, while optimally adjusting a temperature of the wavelength converting element or an element temperature. Hereinafter, the optimal element temperature where the wavelength conversion efficiency is maximized is called as the phase matching temperature.

There are proposed, as conventional methods for adjusting the temperature of a wavelength converting element, a method (temperature constant control) of controlling the temperature of a wavelength converting element to a constant value, and a method (output constant control) of feeding back an output value to an input electric power to an excitation light source. Even if the temperature constant control is used, the element temperature is gradually changed from the phase matching temperature for the following reasons.

(1) The phase matching temperature is changed resulting from a variation in temperature of a semiconductor laser or a fiber laser as an excitation light source, or a variation in wavelength of excitation light to be outputted.

(2) The phase matching temperature is changed resulting from a change in refractive index due to an influence of a stress change accompanied by fixation of a wavelength converting element.

(3) The characteristic of a temperature sensor for measuring the temperature of a wavelength converting element is changed, and the element temperature to be monitored by the temperature sensor is changed from an actual element temperature, which means that the element temperature is apparently changed.

As the difference between the element temperature and the phase matching temperature is increased, wavelength conversion efficiency is lowered. In view of this, output constant control of keeping the output of wavelength converted light constant by increasing the output of excitation light is performed. In this control, however, an increase in electric power consumption cannot be avoided. Also, since the output of excitation light has a limit, the allowable temperature difference is limited. Further, in the case where a semiconductor laser is used to emit excitation light, the life of the light source is shortened, as the electric power to be supplied to the light source is increased. Furthermore, since the beam quality of wavelength converted light to be outputted in a condition that the element temperature and the phase matching temperature are different is poor, it is difficult to apply the light source to a processing apparatus or a medical apparatus requiring a high-quality laser output. In view of this, patent document 1 proposes control of periodically eliminating a difference between the element temperature and the phase matching temperature, in addition to temperature constant control and output constant control.

However, in the conventional art recited in patent document 1, the output constant control is temporarily suspended, and control of making the element temperature close to an element temperature where the output is maximized by detecting a variation in output while increasing or decreasing the element temperature is performed to eliminate a difference between the element temperature and the phase matching temperature. In this control, the output may be varied during the control.

In the case where a wavelength converting element is disposed in a consumer device such as a backlight device of a projection display device or a liquid crystal display device, since the temperature in the casing is gradually increased, a difference between the element temperature and the phase matching temperature may frequently occur, and the output may be unstable each time the difference occurs. As a result, white balance of the display device may be imparted. In view of this, output stability of a laser light source is demanded particularly for a display device.

Patent document 1: JP 2007-233039A

SUMMARY OF THE INVENTION

An object of the invention is to provide a laser light source capable of stabilizing the output thereof by remarkably suppressing output variation, which has occurred during conventional temperature constant control.

A laser light source according to an aspect of the invention includes an excitation light source; a wavelength converting element made of a non-linear optical crystal and having multiple optical paths along which excitation light from the excitation light source passes, for generating output light having a first temperature characteristic and adapted to be emitted to the exterior of the laser light source, and reference light having a second temperature characteristic different from the first temperature characteristic, by converting the excitation light passing through the optical paths into wavelength converted light; a reference light measuring section for measuring the reference light; and a control section for controlling a temperature of the wavelength converting element based on the reference light measured by the reference light measuring section.

In the laser light source, the multiple optical paths along which the excitation light passes are formed in the wavelength converting element, and the temperature of the wavelength converting element is controlled by monitoring the reference light having the temperature characteristic different from the temperature characteristic of the output light serving as the wavelength converted light to be outputted to the exterior of the laser light source. Accordingly, high-speed temperature control can be performed. As a result, output variation which has occurred in the conventional temperature constant control can be remarkably reduced, and output can be stabilized.

DETAILED DESCRIPTION OF THE INVENTION

In the following, laser light sources in accordance with embodiments of the invention are described referring to the (First Embodiment)

Figure 1:
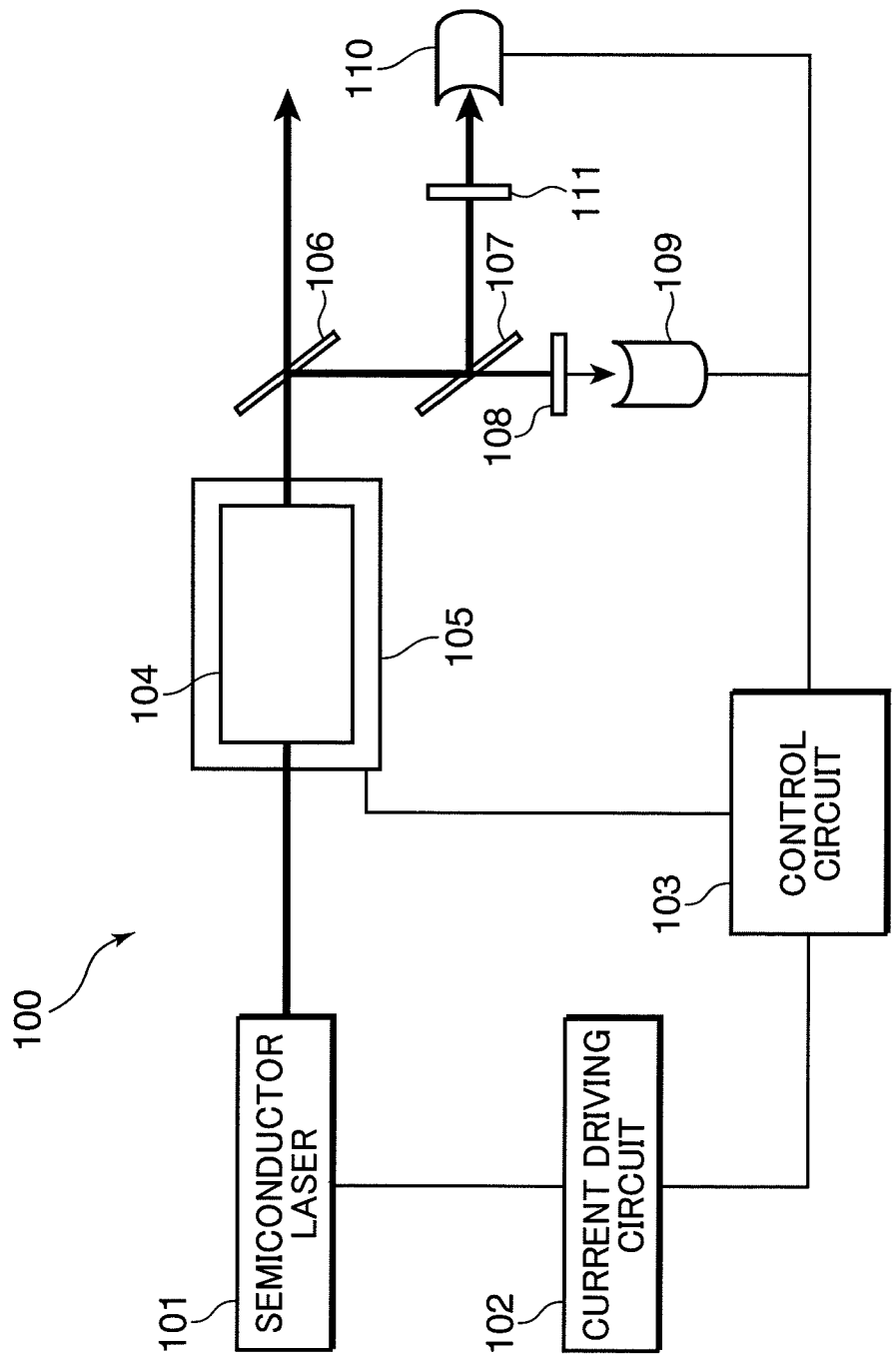
FIG. 1 is a schematic diagram showing an arrangement of a laser light source in accordance with the first embodiment of the invention.

FIG. 1 is a schematic diagram showing an arrangement of a laser light source in accordance with the first embodiment of the invention. In the following, there is described a laser light source, functioning as a wavelength conversion device, in accordance with the first embodiment of the invention referring to FIG. 1.

A laser light source 100 shown in FIG. 1 includes a semiconductor laser 101, a current driving circuit 102, a control circuit 103, a wavelength converting element 104, a heater 105, a light separating mirror 106, a light separating mirror 107, a wavelength selecting filter 108, a photodiode 109, a photodiode 110, and a wavelength selecting filter 111.

The semiconductor laser 101 outputs excitation light with a current from the current driving circuit 102. The outputted excitation light is incident into the wavelength converting element 104, and a part of the excitation light is converted into wavelength converted light. Laser light emitted from the wavelength converting element 104 is incident into the light separating mirror 106, which, in turn, separates the incident laser light into transmitted excitation light without wavelength conversion, and wavelength converted light. In FIG. 1, a harmonic separator having an incident angle of 45°, a transmittance from 98 to 99% of wavelength converted light, and a reflectance of 99% or more of excitation light is used as the light separating mirror 106. The excitation light of 99% or more and the wavelength converted light of 1 to 2% reflected on the light separating mirror 106 are incident into the light separating mirror 107.

A harmonic separator having an incident angle of 45°, and a transmittance substantially the same as that of the light separating mirror 106 is used as the light separating mirror 107. The excitation light and the wavelength converted light transmitted through the light separating mirror 107 are incident into the wavelength selecting filter 108 for absorbing excitation light, and solely the transmitted wavelength converted light is incident into the photodiode 109. Likewise, the excitation light and the wavelength converted light reflected on the light separating mirror 107 are incident into the wavelength selecting filter 111 for absorbing wavelength converted light, and solely the transmitted excitation light is incident into the photodiode 110.

The control circuit 103 calculates an intensity (excitation light output) of excitation light and an intensity (wavelength converted light output) of wavelength converted light to be emitted from the wavelength converting element 104, based on the power of excitation light incident into the photodiode 110, the power of wavelength converted light incident into the photodiode 109, transmittances and reflectances of the mirrors, and the like. Summing up the calculation results enables to obtain an intensity (excitation light input) of excitation light to be incident into the wavelength converting element 104. In this embodiment, the excitation light input is obtained based on excitation light and wavelength converted light emitted from the wavelength converting element 104. This enables to monitor the excitation light input, without loss of excitation light to be incident into the wavelength converting element 104, thereby preventing lowering of conversion efficiency.

The method for measuring the intensity of excitation light to be incident into the wavelength converting element 104 is not specifically limited to the above example. Alternatively, a mirror for reflecting about 1% of excitation light may be provided between the semiconductor laser 101 as an excitation light source, and the wavelength converting element 104 to monitor the excitation light to be reflected on the mirror. The method is advantageous in accurately monitoring the excitation light input, as compared with a method for obtaining the excitation light input based on the sum of intensities of excitation light and wavelength converted light transmitted through a wavelength converting element, in the case where excitation light and wavelength converted light are absorbed in the wavelength converting element 104.

In this embodiment, the control circuit 103 controls a current from the current driving circuit 102 and an electric power for heating the heater 105 to eliminate a difference between the element temperature and the phase matching temperature, based on a value of the excitation light input calculated as described above. The heater 105 is controlled by the control circuit 103 to adjust the temperature of the wavelength converting element 104. The current driving circuit 102 is controlled by the control circuit 103 to adjust the current to be supplied to the semiconductor laser 101.

In the following, a method for controlling a startup operation of the laser light source 100, including the startup operation, is described. First, the startup operation is described.

The phase matching temperature of the wavelength converting element 104 is preferably higher than an environment temperature. In this embodiment, in the case where the environment temperature is e.g. from 0 to 40° C., the phase matching temperature of the wavelength converting element 104 is set to 60° C. This enables to use the inexpensive heater 105 as a member for heating and cooling the wavelength converting element 104 in an environment where the normal temperature is from 0 to 40 °C., without the need of a cooling function of the wavelength converting element 104.

As a startup operation, first, the heater 105 heats the wavelength converting element 104. Simultaneously, the control circuit 103 controls the current driving circuit 102 to maximize a drive current (hereinafter, called as an excitation light current (I)) of the semiconductor laser 101. In this example, it is desirable to set a maximum value (hereinafter, called as $I_{MAX}$) of the excitation light current to a value larger than a current amount (hereinafter, called as $I_0$) to be supplied in a normal operation condition (i.e. when the element temperature coincides with the phase matching temperature) to achieve an intended wavelength converted light output, and to such an extent that the semiconductor laser 101 is not deteriorated and the life thereof is not shortened.

Figure 2:
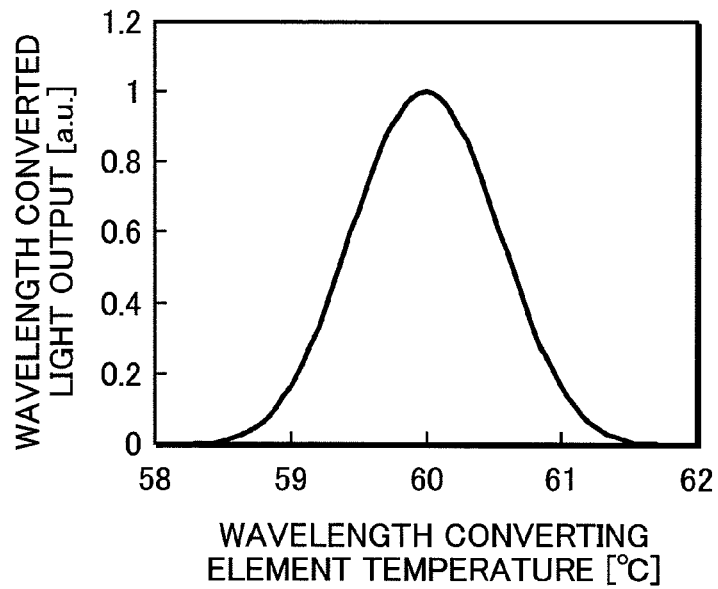
FIG. 2 is a diagram showing a relation between a wavelength converting element temperature, and a wavelength converted light output.

For instance, in the case where a wavelength converting element has a phase matching temperature of 60° C., and a full width at half maximum of the phase matching temperature of about 1.3° C., assuming that the current amount of excitation light (excitation light input) is constant, the wavelength converted light output with respect to the element temperature is maximum at 60° C., as shown in FIG. 2, and the wavelength converted light output is lowered, as the element temperature is shifted to a high temperature side or a low temperature side. In the case where the temperature is constant, the wavelength converted light output is substantially proportional to the square of the excitation light input, and the excitation light input is substantially proportional to the current amount of excitation light.

At a startup time, as described above, the excitation light input is larger than Accordingly, the wavelength converted light output reaches an intended wavelength converted light output before the element temperature reaches the phase matching temperature. The control circuit 103 completes the startup operation at a time when the wavelength converted light output to be monitored by the photodiode 109 has reached an intended value, and proceeds to a normal operation.

Next, the normal operation is described. This embodiment has a feature that output constant control of keeping the wavelength converted light output constant, and temperature control of making the element temperature coincident with the phase matching temperature (temperature control of adjusting the temperature of the wavelength converting element 104 to minimize the intensity of excitation light to be incident into the wavelength converting element 104) are simultaneously performed during the normal operation.

In the output constant control, the control circuit 103 controls the current driving circuit 102 to make the wavelength converted light output to be monitored by the photodiode 109 constant. Specifically, the control circuit 103 increases the wavelength converted light output to an intended value by increasing the excitation light current, in the case where the wavelength converted light output is lower than the intended value; and decreases the wavelength converted light output to an intended value by decreasing the excitation light current, in the case where the wavelength converted light output is higher than the intended value.

Figure 3:
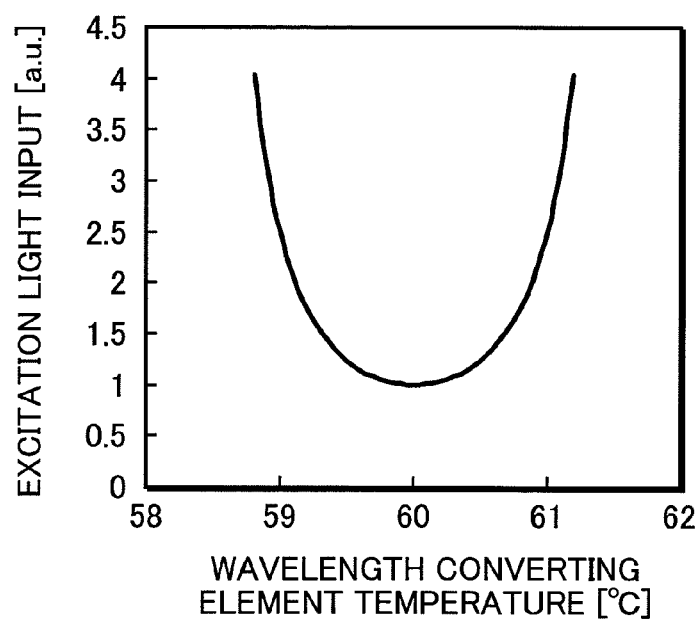
FIG. 3 is a diagram showing a relation between a wavelength converting element temperature, and an excitation light output during output constant control.

As described above, in the case where the excitation light current is increased or decreased to make the wavelength converted light output constant, the excitation light input is changed, as shown in FIG. 3. In this embodiment, as described above, performing the temperature control utilizing a relation between the excitation light input and the element temperature at the time of performing the output constant control enables to perform the temperature control simultaneously with the output constant control, without suspending the output constant control.

Next, in this embodiment, a temperature control method to be performed based on the excitation light input at the time of performing the output constant control is described as follows. In this example, the excitation light input is calculated based on values from the photodiodes 109 and 110, considering a transmittance, a reflectance, and the like of the light separating mirror 106 and the like.

Figure 5:
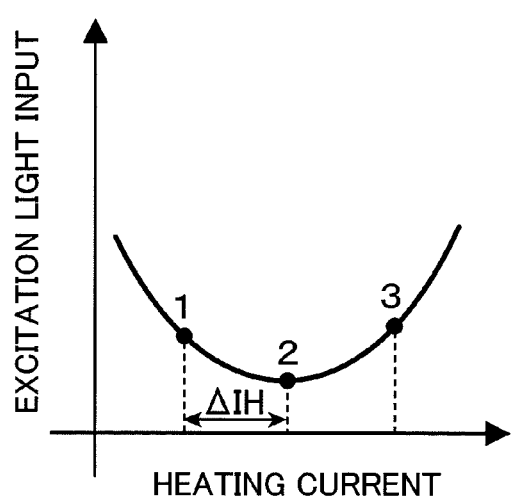
FIG. 5 is a diagram showing a second relation between a heating current to a heater, and an excitation light input during output constant control.
Figure 6:
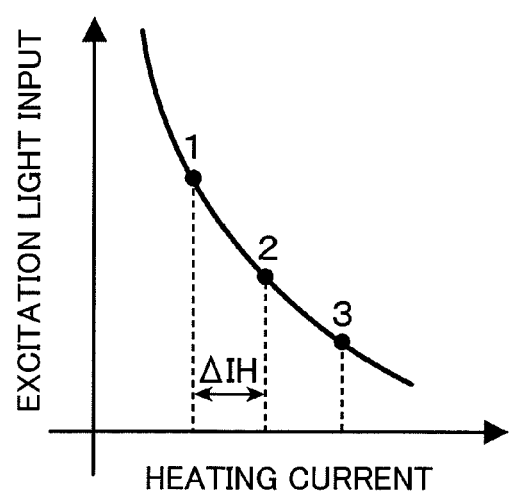
FIG. 6 is a diagram showing a third relation between a heating current to a heater, and an excitation light input during output constant control.

In performing the temperature control, the control circuit 103 judges whether the heating current to the heater 105 should be increased or decreased, based on an increase or a decrease in excitation light input accompanied by an increase in element temperature, by increasing the heating current to the heater 105. For instance, in the case where the excitation light input is monitored while increasing the heating current to the heater 105 by a predetermined variation $\Delta IH$, and the excitation light input at three successive points of time closest to the current time is stored, a change status of the excitation light input is categorized into three conditions as shown in FIGS. 4 through 6.

Figure 4:
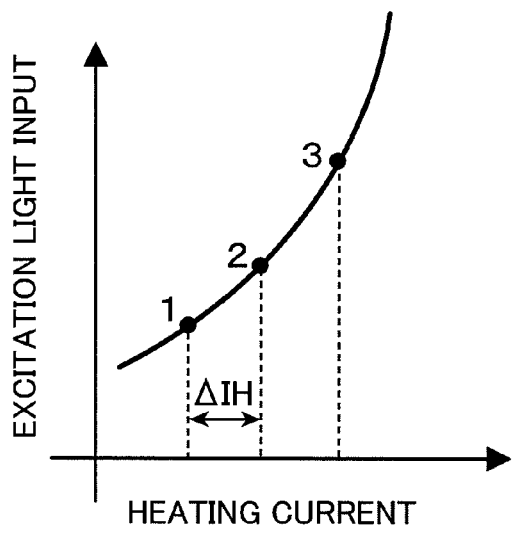
FIG. 4 is a diagram showing a first relation between a heating current to a heater, and an excitation light input during output constant control.

As shown in FIG. 4, in the case where the excitation light input at three successive points of time closest to the current time is monotonously increased, it is clear that the element temperature is higher than the phase matching temperature. Also, as shown in FIG. 5, in the case where the excitation light input at three successive points of time closest to the current time is decreased and then increased, it is clear that the element temperature is near the phase matching temperature, and is higher than the phase matching temperature. In these conditions, the control circuit 103 decreases the heating current to lower the element temperature. On the other hand, as shown in FIG. 6, in the case where the excitation light input at three successive points of time closest to the current time is monotonously decreased, it is clear that the element temperature is lower than the phase matching temperature. In this case, the control circuit 103 increases the heating current to increase the element temperature.

In this example, if $\Delta IH$ is unduly large, the width of variation of the element temperature is increased. It is needless to say that the allowable temperature range where the output constant control can be performed is determined depending on $I_{MAX}$. The width of variation in element temperature is required to be set to one half of the allowable temperature range or less. In the case where $I_{MAX}$ is set to 1.5 times of $I_0$, it is required to calculate an increasing amount of a heating current capable of increasing the element temperature by the full width at half maximum, and set $\Delta IH$ at least to one half of the heating current increasing amount or less, desirably one tenth thereof. This enables to reduce the width of hunting for the element temperature in control, and increase the average value of wavelength conversion efficiency.

Also, after the heating current to the heater 105 is increased by $\Delta IH$, a time required for making the element temperature constant may be stored in advance in the control circuit 103, and the heating current amount may be monitored at an interval of the stored time. This enables to reduce a load required in hunting for the element temperature in control, and increase the control speed, thereby increasing the average conversion efficiency.

Alternatively, the temperature of the wavelength converting element 104 may be directly monitored by a thermistor or a like device. Performing the temperature control using a variation $\Delta T$ of the element temperature, in place of using $\Delta IH$, is desirable because more accurate temperature control can be performed.

Further alternatively, an excitation light input required for making the element temperature coincident with the phase matching temperature may be stored in advance in the control circuit 103 as $P_0$, and in the case where the excitation light input is close to $P_0$, the temperature control of making the element temperature coincident with the phase matching temperature may be temporarily suspended, and the temperature constant control may be performed by making the amount of a heating current to the heater 105 constant. However, in this modification, in the case where the excitation light input is increased, it is necessary to switch the control from the temperature constant control to the temperature control of making the element temperature coincident with the phase matching temperature. Further, in the case where the control is switched to the temperature constant control, the output constant control is concurrently preformed with the temperature constant control. Use of the above method enables to reduce a load to the control circuit 103 required for performing the temperature constant control during the temperature constant control. In the case where the wavelength converting element 104 is deteriorated or a like drawback has occurred, $P_0$ is increased. In view of this, it is desirable to periodically update $P_0$ to be stored in the control circuit 103.

In the case where a predetermined threshold value is predefined, and the temperature constant control is performed when the excitation light input is lower than the threshold value, the average conversion efficiency during the temperature constant control is further increased by making the threshold value close to $P_0$. However, as the threshold value is made close to $P_o$, the allowable temperature range for the temperature constant control is reduced. For instance, in the example of FIG. 3, in the case where a value 1.1 times of $P_0$ is defined as the threshold value, and the element temperature is in the range of the phase matching temperature ±0.4° C., the temperature constant control can be performed. In the case where a value 1.3 times of $P_0$ is defined as the threshold value, and the element temperature is in the range of the phase matching temperature ±0.5° C., the temperature constant control can be performed. A degree of change in difference between the element temperature and the phase matching temperature in actual use differs depending on a magnitude of temperature change in a usage environment, the kind of an excitation light source to be used, and the like. Accordingly, it is desirable to set a threshold value, considering the above requirement.

In this embodiment, since the output constant control of making the wavelength converted light output constant is used, an increase or a decrease in excitation light input for incidence into the wavelength converting element 104 coincides with an increase or a decrease in excitation light output for incidence into the photodiode 110. Accordingly, a relation between a value from the photodiode 110 and the element temperature is similar to the relation as shown in FIG. 3. In the case where a semiconductor laser is used as an excitation light source, since the excitation light current amount is substantially proportional to the excitation light output, a relation between the excitation light current amount and the element temperature is similar to the relation as shown in FIG. 3.

In other words, it is possible to perform the temperature control of making the element temperature coincident with the phase matching temperature by increasing or decreasing the excitation light output for incidence into the photodiode 110, or the excitation light current amount (i.e. an input electric power to the semiconductor laser 101 as an excitation light source) at the time of performing the output constant control, in place of increasing or decreasing the excitation light input. The modification is advantageous in obtaining substantially the same effect as the temperature control using the excitation light input, as described above. In the case where the control is performed by monitoring an increase or a decrease in excitation light current amount, the number of photodiodes to be used can be reduced. This is more advantageous in realizing an inexpensive laser light source.

Assuming that a value obtained by dividing the wavelength converted light output by the square of the excitation light input is a normalized wavelength conversion efficiency, the normalized wavelength conversion efficiency is increased, as the element temperature is close to the phase matching temperature, similarly to the wavelength converted light output shown in FIG. 2. An increase or a decrease in normalized wavelength conversion efficiency is inversely proportional to an increase or a decrease in excitation light input, excitation light current amount, and excitation light output; however depends solely on the element temperature, without being affected by an increase or a decrease in excitation light input. In view of this, it is possible to perform a control of adjusting the element temperature to maximize the normalized wavelength conversion efficiency concurrently with the output constant control during the output constant control, similarly to the control with respect to the excitation light input, the excitation light current amount, and the excitation light output. The modification is also advantageous in obtaining substantially the same effect as the temperature control using the excitation light input, as described above.

It is desirable to use a quasi phase matching wavelength converting element containing lithium niobate or lithium tantalate as a primary component, as the wavelength converting element 104. This arrangement enables to perform high-efficient wavelength conversion. In this embodiment, described is an example, wherein the wavelength converting element has a phase matching temperature of 60° C. With use of the quasi phase matching wavelength converting element, it is possible to perform wavelength conversion at any phase matching temperature by adjusting the cycle of a cyclic polarization inversion structure to be formed.

In a wavelength converting element made of lithium niobate or lithium tantalate, output variation with respect to a temperature change is large, and output variation resulting from a temperature change due to absorption of excitation light or wavelength converted light is likely to occur. Use of the control in this embodiment, however, enables to obtain stable output.

Further, setting the phase matching temperature to 50° C. or more, and setting the phase matching temperature higher than the environment temperature enables to prevent scattering of laser light due to dew condensation on an incident/exit surface of the wavelength converting element, and use an inexpensive heater, as a member for adjusting the element temperature.

Further, it is needless to say that a temperature regulator having a function of lowering the element temperature such as a Peltier element may be used for temperature control. Use of a Peltier element increases the rate of lowering the element temperature. Use of a Peltier element also enables to perform a control in the case where the environment temperature exceeds the phase matching temperature.

In this embodiment, the semiconductor laser 101 is used as an excitation light source. Alternatively, a fiber laser or a solid-state laser may be used as an excitation light source. Use of a fiber laser or a solid-state laser as an excitation light source enables to obtain laser light having a large peak output and an excellent beam quality, wherein $M^2$ (M square) is 1.4 or less. This enables to realize a laser light source suitable for laser processing.

(Second Embodiment)

Figure 7:
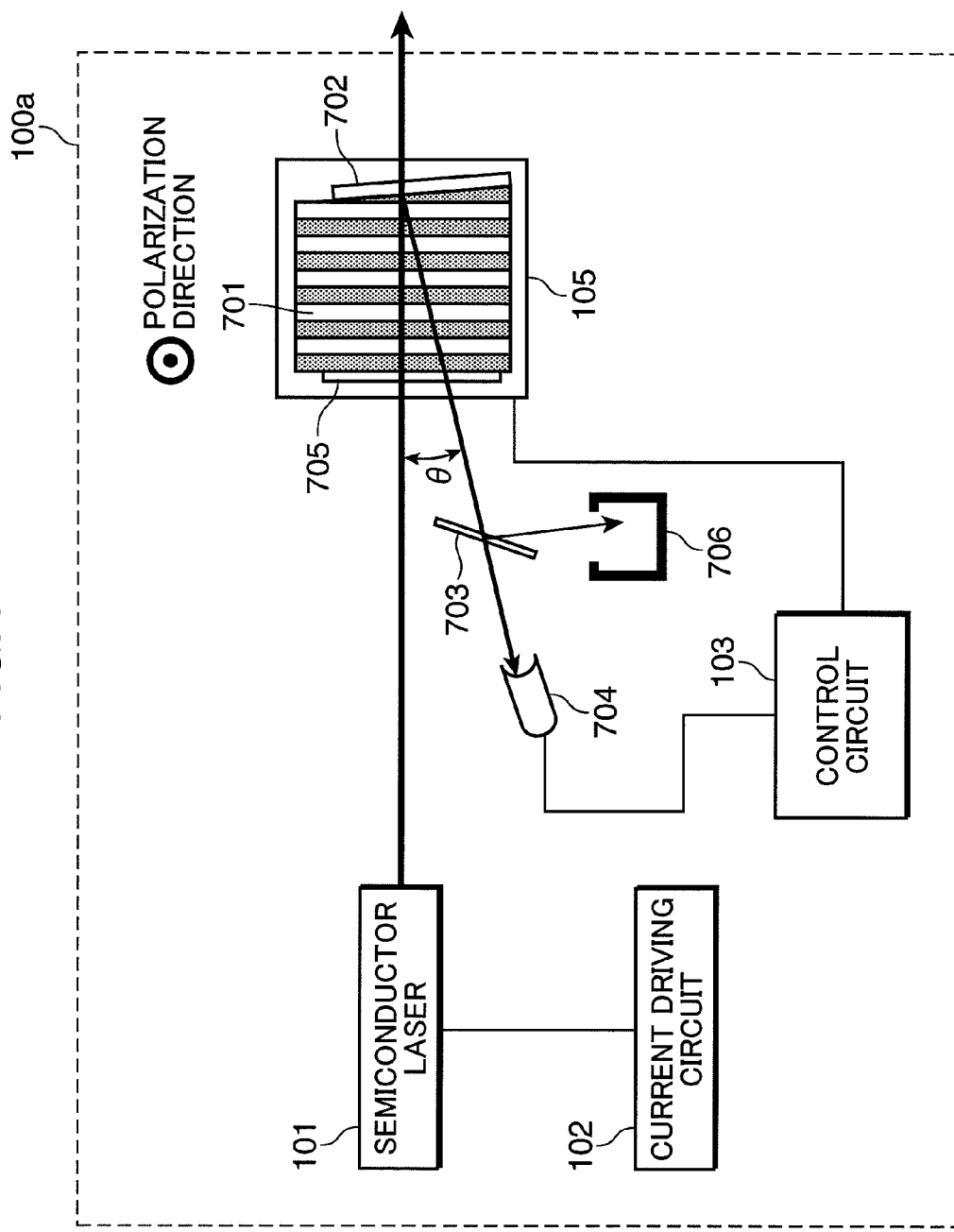
FIG. 7 is a schematic diagram showing an arrangement of a laser light source in accordance with the second embodiment of the invention.

FIG. 7 is a schematic diagram showing an arrangement of a laser light source in accordance with the second embodiment of the invention. In the following, a laser light source, functioning as a wavelength conversion device, in accordance with the second embodiment is described referring to FIG. 7.

A laser light source 100a shown in FIG. 7 includes a semiconductor laser 101, a current driving circuit 102, a control circuit 103, a heater 105, a quasi phase matching wavelength converting element 701, a light separating coat 702, a light separating mirror 703, a photodiode 704, an anti-reflective coat 705, and a beam stopper 706.

Similarly to the first embodiment, the semiconductor laser 101 generates excitation light with a current from the current driving circuit 102. In this embodiment, excitation light is incident into the quasi phase matching wavelength converting element (hereinafter, also called as "wavelength converting element") 701. In the incidence, the polarization direction (i.e. the direction orthogonal to the plane of FIG. 7) of the wavelength converting element 701, and the polarization direction of excitation light coincide with each other. Excitation light is incident in parallel to the polarization inversion cycle, in other words, in alignment with the direction (leftward and rightward directions in FIG. 7) of polarization inversion cycle, and a part of the excitation light is converted into wavelength converted light.

In this example, the light separating coat 702 is formed on an exit end of the wavelength converting element 701. The light separating coat 702 reflects 90% or more of excitation light, and transmits 99.8% or more of wavelength converted light. Defining the incident angle of excitation light with respect to the exit end to θ/2° allows excitation light to be reflected on the light separating coat 702 to propagate through the wavelength converting element 701 with an inclination of θ° with respect to the polarization inversion cycle, as shown in FIG. 7, and a part of the excitation light is converted into wavelength converted light. Hereinafter, an optical path along which excitation light incident for the first time propagates is called as an incoming path, and an optical path along which excitation light reflected on the exit end propagates is called as an outgoing path.

Excitation light on the outgoing path, and wavelength converted light generated from the excitation light on the outgoing path are emitted from an incident end (with respect to the incoming path). The excitation light and the wavelength converted light on the outgoing path which are transmitted through the incident end of the wavelength converting element 701 are incident into the light separating mirror 703. In this example, the light separating mirror 703 reflects excitation light, and transmits wavelength converted light. The wavelength converted light transmitted through the light separating mirror 703 is incident into the photodiode 704, and the control circuit 103 monitors the output from the photodiode 704. The excitation light reflected on the light separating mirror 703 is incident into the beam stopper 706, and stopped thereat.

In this embodiment, wavelength converted light generated on the incoming path is emitted to the exterior of the laser light source 100a, as output light. At the emission, the control circuit 103 enables to control the intensity of the output light constant by using the wavelength converted light generated on the outgoing path as reference light, and adjusting the temperature of the wavelength converting element 701 using the heater 105. In the following, the control method is described.

Figure 8:
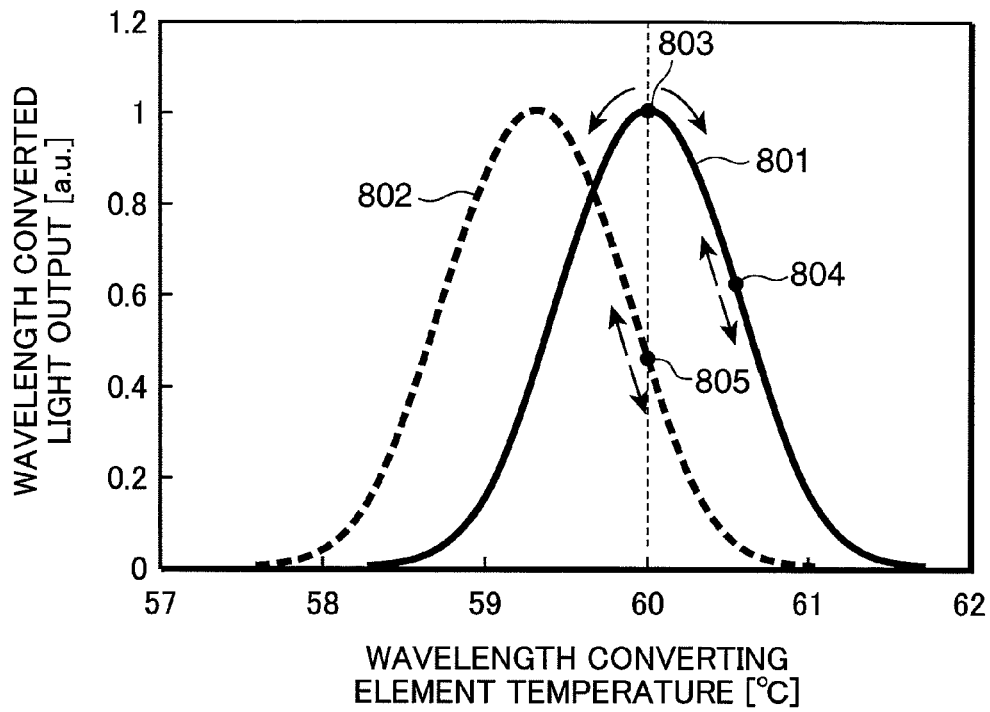
FIG. 8 is a diagram showing a relation between a wavelength converting element temperature, and outputs of output light and reference light.

FIG. 8 is a diagram showing temperature characteristics of output light and reference light. Referring to FIG. 8, the vertical axis indicates normalized intensities of output light and reference light, in the case where the outputs of output light and reference light at the phase matching temperature are set to 1, and the horizontal axis indicates a temperature of the wavelength converting element 701. The solid line in FIG. 8 indicates a temperature characteristic 801 of output light, and the broken line in FIG. 8 indicates a temperature characteristic 802 of reference light. The temperature characteristic 802 of reference light is shifted to a low temperature side with respect to the temperature characteristic 801 of output light. Thus, it is clear that the phase matching temperature of reference light is lower than the phase matching temperature of output light.

Figure 9:
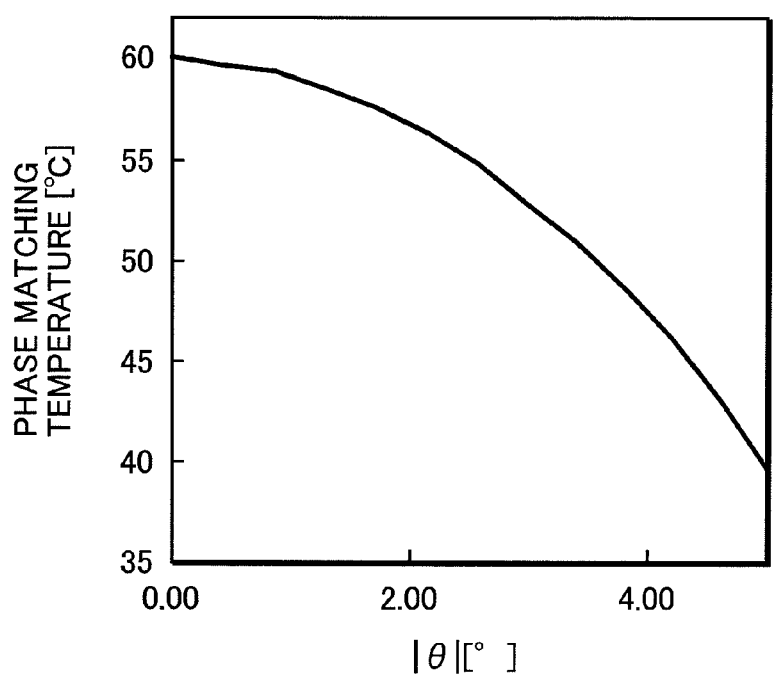
FIG. 9 is a diagram showing a relation between an angle defined by a direction of polarization inversion cycle and an optical path of excitation light in a quasi phase matching wavelength converting element, and a phase matching temperature.

In a quasi phase matching wavelength converting element, as the absolute value of an angle defined by an optical path and a direction of polarization inversion cycle is increased, the phase matching temperature where the output of wavelength converted light is maximized is lowered. For instance, in the case where excitation light of 1064 nm wavelength is subjected to wavelength conversion into light of 532 nm wavelength as a second harmonic, using a quasi phase matching wavelength converting element containing lithium niobate as a primary component, as shown in FIG. 9, an increase in the absolute value of the angle θ defined by the optical path and the direction of polarization inversion cycle results in lowering the phase matching temperature where the output of wavelength converted light is maximized. In this embodiment, since the angle defined by the incoming path and the direction of polarization inversion cycle is set to 0°, as shown in FIG. 8, a difference in phase matching temperature between the incoming path and the outgoing path becomes about 0.7° C. when the angle defined by the outgoing path and the direction of polarization inversion cycle is θ=±1°.

As described above, in this embodiment, reference light whose phase matching temperature is different from the phase matching temperature of output light is generated, and temperature adjustment is performed based on a variation in intensity of the reference light. This enables to perform high-speed and stable control, as compared with a conventional arrangement of performing temperature adjustment based on a variation in intensity of the output light. In the following, a feature of this embodiment is described in comparison with a conventional temperature adjusting method.

First, as shown in patent document 1, in a conventional temperature adjustment for a wavelength converting element without using reference light, the intensity of output light is measured, and temperature adjustment for a wavelength converting element is performed based on the temperature characteristic 801 of output light. In other words, temperature constant control is performed at a standby position 803, and in the case where a difference between the element temperature and the phase matching temperature is increased, temperature adjustment of eliminating the difference between the phase matching temperature and the element temperature is performed.

In the conventional temperature adjusting method, in the case where the wavelength conversion efficiency is lowered from the standby position 803, it is impossible to judge whether the element temperature is higher or lower than the phase matching temperature. Accordingly, the wavelength converting element is temporarily heated or cooled, and then it is judged whether the wavelength converting element should be heated or cooled based on a variation in output of the wavelength converted light as a result of the heating or cooling operation. In this method, a time required for eliminating the difference between the element temperature and the phase matching temperature is long, and stable output cannot be obtained.

In view of the above, there is proposed a control method of maintaining the element temperature on a high temperature side with respect to the phase matching temperature in advance, as indicated by a standby position 804. In this method, it is clear that the element temperature is lowered (or raised) by an increase (or a decrease) in output of wavelength converted light, which enables to promptly judge whether the wavelength converting element should be heated (or cooled). A control similar to the above can be performed, in the case where a low temperature side with respect to the phase matching temperature is defined as a standby position.

The above method enables to perform high-speed temperature adjustment, and stabilize the output of wavelength converted light, however, fails to maximize the conversion efficiency of a wavelength converting element. Also, in the case where wavelength conversion is performed at a temperature different from the phase matching temperature, the quality of a beam to be generated is deteriorated.

Unlike the above methods, in the temperature adjusting method of this embodiment, the temperature of the wavelength converting element 104 is adjusted, based on the temperature characteristic 802 of reference light to be subjected to wavelength conversion at a phase matching temperature different from the phase matching temperature of the output light (e.g. the temperature characteristic 802 of reference light which is shifted to a low temperature side with respect to the temperature characteristic 801 of output light).

First, in this embodiment, the control circuit 103 stores in advance the intensity of reference light, when the element temperature coincides with the phase matching temperature of output light. Performing temperature adjustment using the control circuit 103 so that the intensity of the reference light coincides with the stored value enables to set the standby position to a standby position 805 of the temperature characteristic 802 of reference light. Monitoring the output (intensity) of the reference light at the standby position 805 enables to recognize that the element temperature is lowered (or raised) by an increase (or a decrease) in output of the reference light, which enables to promptly judge whether the wavelength converting element should be heated (or cooled).

As described above, in this embodiment, performing temperature adjustment based on the output of reference light enables to perform high-speed temperature control, and high-efficient and stable wavelength conversion. The above arrangement also enables to prevent deterioration of output beams.

In this embodiment, since the remainder of excitation light after wavelength conversion on the incoming path is used, it is possible to obtain reference light, without lowering the conversion efficiency of output light. Also, since the remainder of excitation light after wavelength conversion on the incoming path is used, the wavelengths of excitation light between the incoming path and the outgoing path coincide with each other. This enables to suppress a variation in difference of the phase matching temperature between the output light and the reference light.

In the case where the excitation light input is made variable in the laser light source utilizing the control of this embodiment, it is desirable to store a relation between the excitation light input and an optimal reference light output in advance, because the output of reference light at the phase matching temperature of output light is changed depending on the excitation light input.

Further, it is desirable to perform temperature control, using a normalized wavelength conversion efficiency which does not vary by an increase or a decrease in excitation light input, in place of using a reference light output. In this example, as described in the first embodiment, the normalized wavelength conversion efficiency is a value obtained by dividing the output of reference light by the square of the excitation light output. In the case where the normalized wavelength conversion efficiency is used in place of the reference light output, excitation light after transmittance through the outgoing path may be incident into a photodiode, in place of the beam stopper 706, and the output from the photodiode may be monitored.

It is desirable to use a quasi phase matching wavelength converting element containing lithium niobate or lithium tantalate as a primary component, as the wavelength converting element 701. This arrangement enables to perform high-efficient wavelength conversion. In this embodiment, the angle defined by the outgoing path and the direction of polarization inversion cycle is $\theta = \pm 1°$. In the case where a quasi phase matching wavelength converting element containing lithium niobate or lithium tantalate as a primary component is used, it is desirable to set the angle $\theta$ defined by the outgoing path and the direction of polarization inversion cycle to at least not smaller than (the full width at half maximum of the phase matching temperature on the outgoing path)$^{1/2} \times 0.32°$ and not larger than (the full width at half maximum of the phase matching temperature on the outgoing path)$^{1/2} \times 1.15°$. This enables to provide a laser light source having improved stability of output light by temperature control using the outgoing path, and suitable for medical use. It is desirable to set the angle $\theta$ to not smaller than (the full width at half maximum of the phase matching temperature on the outgoing path)$^{1/2} \times 0.65°$ for use in a display device requiring further output stability. In a wavelength converting element using lithium niobate or lithium tantalate, output variation is likely to occur resulting from a temperature change due to absorption of excitation light or wavelength converted light. Use of the above arrangement in this embodiment, however, enables to obtain stable output.

In this embodiment, a quasi phase matching wavelength converting element is used. Alternatively, in the case where a birefringent phase matching wavelength converting element is used, since the phase matching temperature is changed by changing the angle between the polarization direction of excitation light and the optical axis of a crystal, it is possible to obtain reference light whose phase matching temperature is different from the phase matching temperature of output light. Thus, since temperature adjustment similar to the above can be performed, the above modification is particularly desirable in the case where a birefringent phase matching wavelength converting element such as an LBO-substrate or a KTP-substrate is used.

It is possible to freely adjust the phase matching temperature by partially adjusting the cycle of a quasi phase matching wavelength converting element. Accordingly, use of a quasi phase matching wavelength converting element is desirable in the following condition. For instance, in the case where it is difficult to install the light separating mirror 703 or the photodiode 704 due to a small angle of excitation light between the incoming path and the outgoing path, the angle between the incoming path and the outgoing path may be set to as large as about 5°. In this case, as shown in FIG. 9, the phase matching temperature on the outgoing path is about 40° C.

Figure 10:
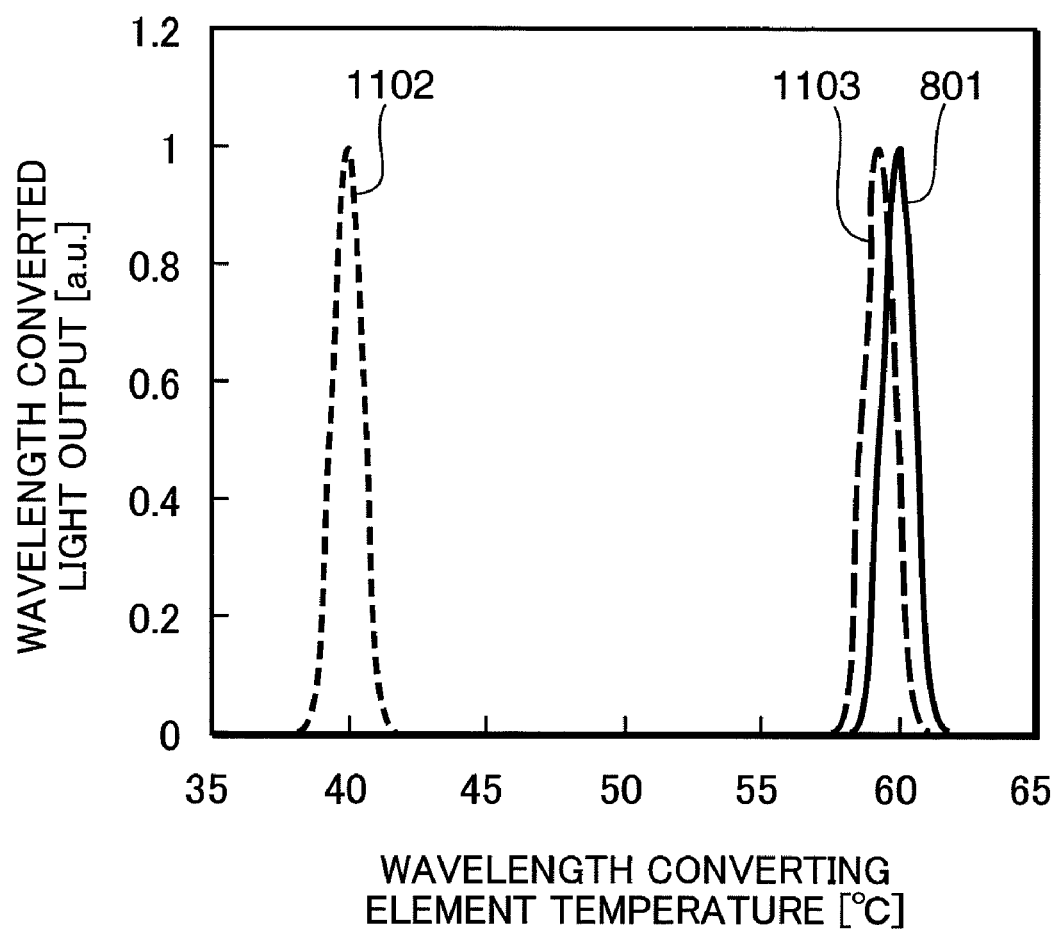
FIG. 10 is a diagram showing a relation between a wavelength converting element temperature, and outputs of output light and reference light.

FIG. 10 is a diagram showing a relation between the wavelength converting element temperature, and outputs of output light and two kinds of reference light having different angles from each other. As shown in FIG. 10, a temperature characteristic 1102 of reference light in the case where the angle between the incoming path and the outgoing path is set to 5° is not overlapped with the temperature characteristic 801 of output light. Accordingly, the temperature control as described referring to FIG. 8 cannot be performed. In this case, the temperature characteristic 1102 of reference light can be easily turned into a temperature characteristic 1103 of reference light having an overlapped portion with the temperature characteristic 801 of output light by changing the polarization inversion cycle on the outgoing path relative to that on the incoming path by using a quasi phase matching wavelength converting element as the wavelength converting element 701. This arrangement allows the temperature characteristics of output light and reference light to have relations similar to the ones shown in FIG. 8.

In the case where the angle between the incoming path and the outgoing path is set to as large as about 5°, as is obvious from FIG. 9, a difference in phase matching temperature between the incoming path and the outgoing path due to the angle difference is increased. As a result, a difference in phase matching temperature between the output light and the reference light is likely to vary. In this embodiment, it is desirable to set the output of reference light to not smaller than 15% and not larger than 85% of the maximal output thereof at the phase matching temperature of output light (the reason for this setting is described later). Also, it is necessary to suppress a variation in the incident angle $\theta/2°$ of excitation light with respect to the exit end of the wavelength converting element to suppress a variation in difference in phase matching temperature between the output light and the reference light.

Figure 11:
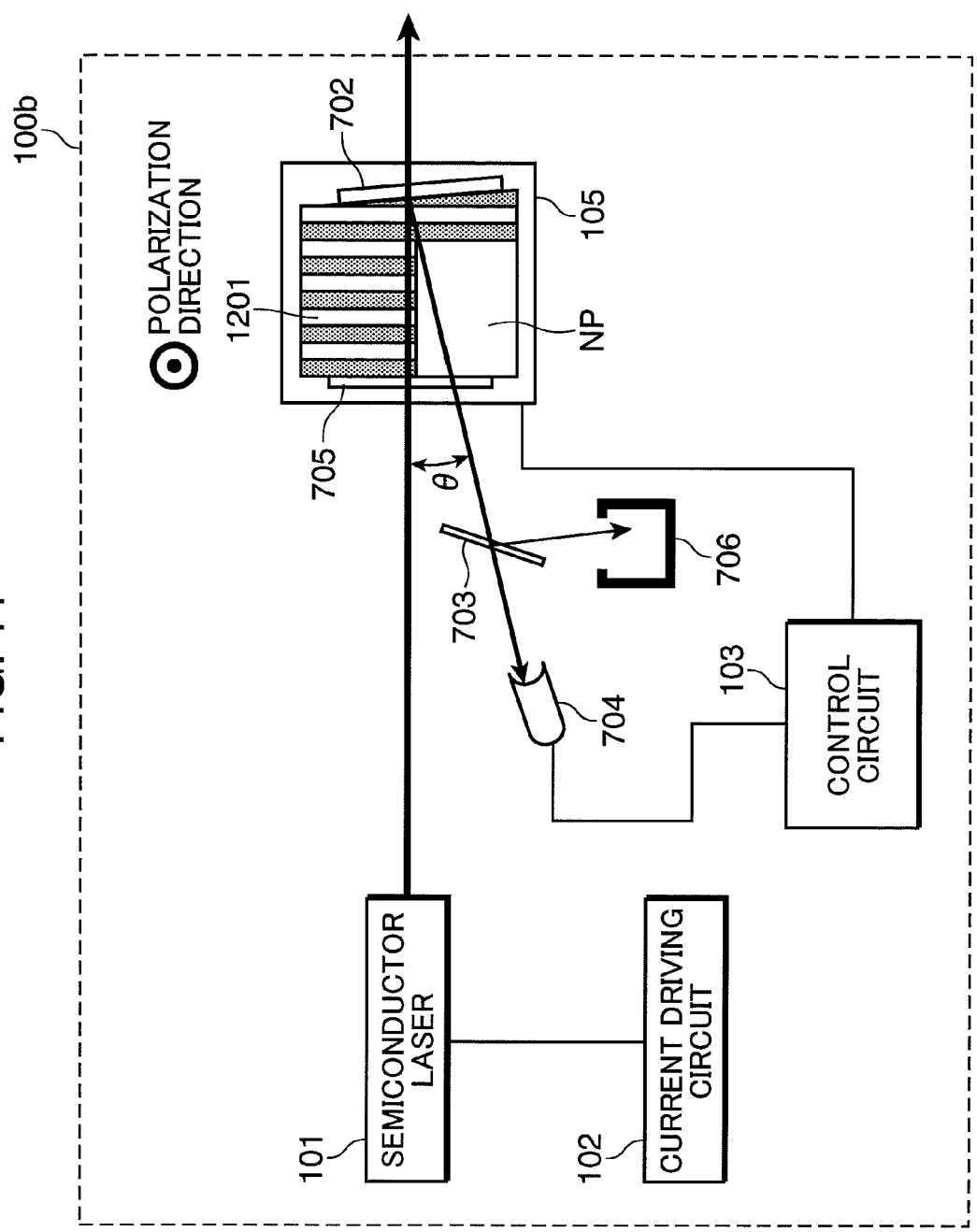
FIG. 11 is a schematic diagram showing another arrangement of the laser light source in accordance with the second embodiment of the invention.

FIG. 11 is a schematic diagram showing another arrangement of the laser light source in accordance with the second embodiment of the invention. A laser light source 100b shown in FIG. 11 is different from the laser light source 100a shown in FIG. 7 in that a wavelength converting element 1201 is used in place of the wavelength converting element 701, and the wavelength converting element 1201 has a portion NP where a cyclic polarization inversion structure is not formed on a part of an outgoing optical path.

Figure 12:
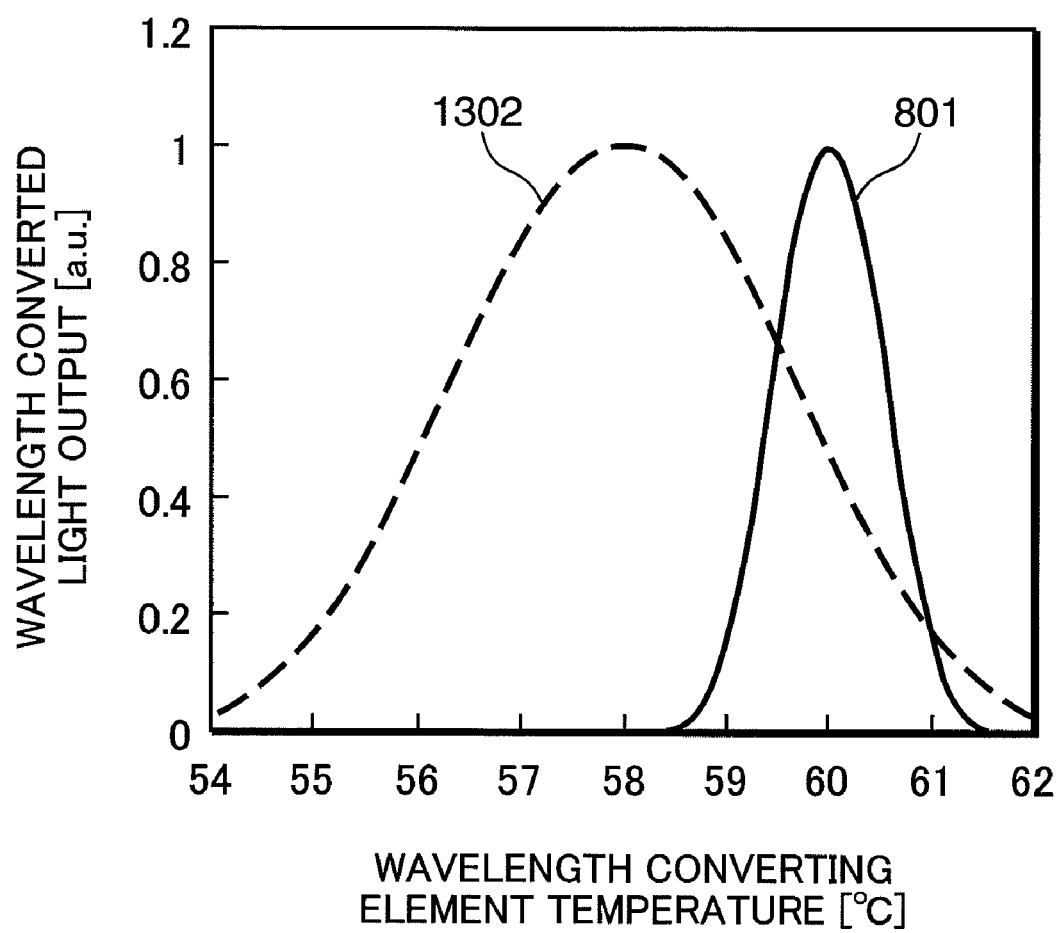
FIG. 12 is a diagram showing a relation between a wavelength converting element temperature, and outputs of output light and reference light, in the case where the wavelength converting element has a portion where a cyclic polarization inversion structure is not formed.

As shown in FIG. 11, in the case where the wavelength converting element 1201 with the portion NP where a cyclic polarization inversion structure is not formed on a part of an outgoing optical path is used, as shown in FIG. 12, a temperature characteristic 1302 of reference light has a reduced temperature dependence, has a peak portion with a moderate gradient, and is overlapped with the temperature characteristic 801 of output light. In this way, it is desirable to increase the tolerance of difference in phase matching temperature between the output light and the reference light by reducing the temperature dependence of the temperature characteristic 1302 of reference light.

It is desirable to set the output of reference light to not smaller than 15% and not larger than 85% of the maximal output of reference light, when the element temperature coincides with the phase matching temperature of output light, and the intensity of output light is maximized. Setting the output of reference light to not smaller than 15% and not larger than 85% of the maximal output of reference light enables to perform high-precision temperature control, with a sufficiently high S/N ratio. It is further desirable to set the output of reference light to not smaller than 30% and not larger than 60% of the maximal output of reference light. In this arrangement, since output variation of reference light with respect to a temperature change can be made sufficiently large, high-speed temperature control can be performed, and output variation can be further reduced.

In the case where output light is intruded in reference light, the intruded light may become a noise in the reference light. As a result, high-precision temperature control cannot be performed. In view of this, in this embodiment, it is preferable to set the reflectance of the light separating coat 702 with respect to wavelength converted light to 5% or less. This arrangement enables to suppress intrusion of output light into reference light. It is also desirable to enhance the conversion efficiency on the outgoing path, because the enhanced conversion efficiency is advantageous in reducing an influence of output light as a noise in reference light, and increasing the S/N ratio.

In this embodiment, it is particularly desirable to use a wavelength converting element having a slab waveguide path where alignment is easy, or a bulk type wavelength converting element (without a waveguide path) to form two optical paths (the incoming path and the outgoing path) of excitation light in the wavelength converting element 701 or a like member. In particular, in the case where the wavelength converted light output is 10 W or less, use of a wavelength converting element having a slab waveguide path makes it easy to secure an intensity of excitation light on the outgoing path, and enables to obtain a high conversion efficiency from excitation light into wavelength converted light on the outgoing path. Thereby, the S/N ratio of reference light can be made sufficiently high.

In the case where excitation light of a wavelength not larger than 1200 nm is incident for conversion into wavelength converted light of a wavelength not larger than 600 nm, with use of a wavelength converting element made of lithium niobate or lithium tantalate, a wavelength converted light output in excess of 500 mW may cause a temperature difference between the incoming path and the outgoing path, resulting from an exothermic operation due to light absorption in the wavelength converting element. This temperature difference may become a noise in the control of this embodiment. In view of this, it is desirable to use a bulk type wavelength converting element capable of easily reducing influences of light absorption and temperature increase resulting from the light absorption by increasing the beam diameter. The bulk type wavelength converting element also has a feature that propagation loss in the wavelength converting element is small.

Figure 13:
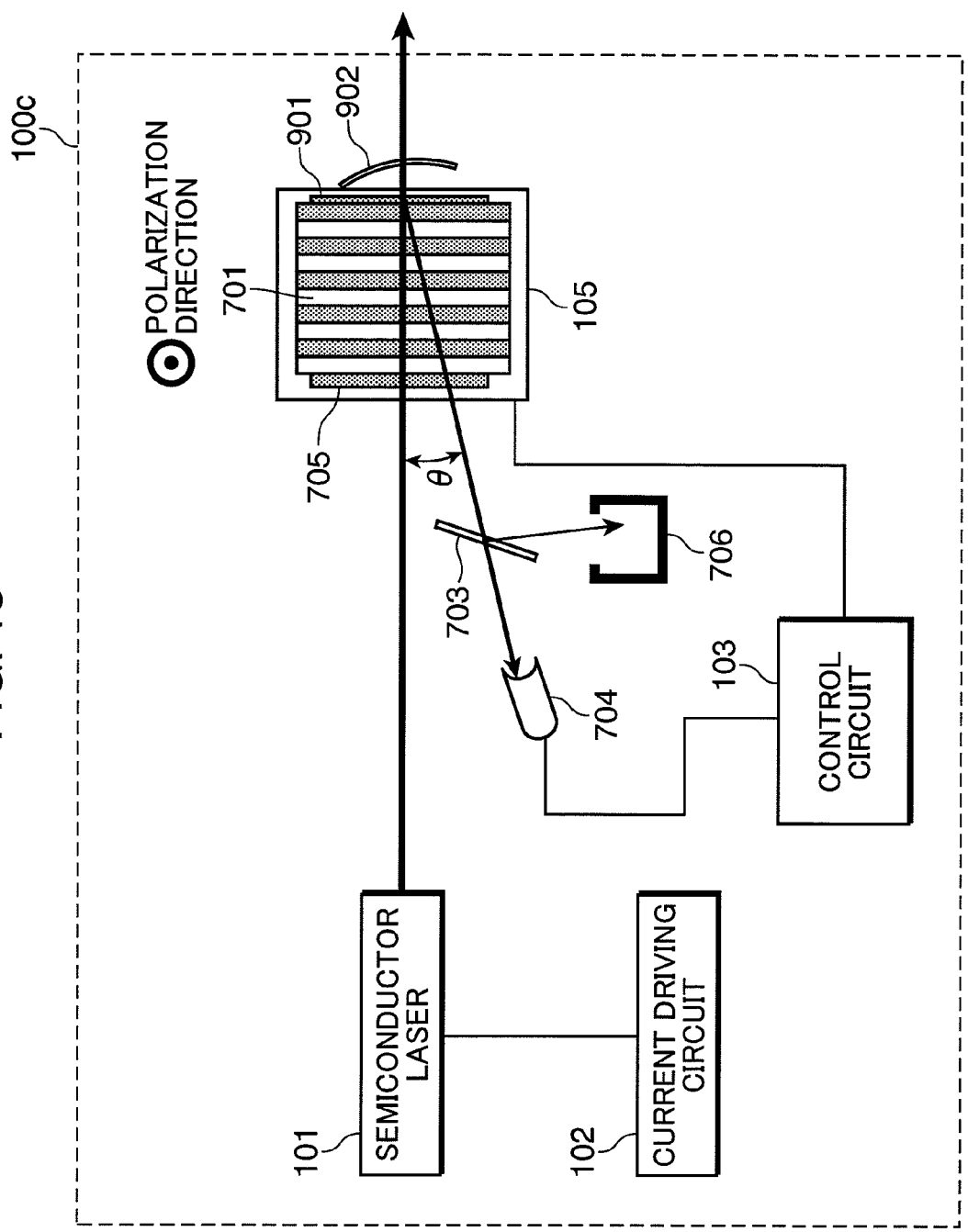
FIG. 13 is a schematic diagram showing yet another arrangement of the laser light source in accordance with the second embodiment of the invention.

FIG. 13 is a schematic diagram showing yet another arrangement of the laser light source in accordance with the second embodiment of the invention. In the case where a bulk type wavelength converting element is used, use of the following method using a laser light source 100c shown in FIG. 13 enables to increase the wavelength conversion efficiency on the outgoing path, and increase the S/N ratio of reference light.

The laser light source 100c shown in FIG. 13 is constructed in such a manner that a quasi phase matching wavelength converting element 701 has anti-reflective coats 705 and 901 for transmitting 99% or more of excitation light and wavelength converted light at an incident end and an exit end thereof, respectively, for incidence of excitation light into the quasi phase matching wavelength converting element 701. The excitation light and the wavelength converted light transmitted through the exit end are incident into a light separating mirror 902 for reflecting excitation light and transmitting wavelength converted light for re-incidence of solely the excitation light into the quasi phase matching wavelength converting element 701. The re-incident excitation light is capable of generating wavelength converted light. The output of the wavelength converted light is detected by a photodiode 704, and a control circuit 103 monitors the output of the wavelength converted light.

In the above arrangement, reference light can be condensed in the wavelength converting element 701 by using a concave surface mirror as the light separating mirror 902, and adjusting the position and the curvature of the light separating mirror 902. This enables to increase the efficiency of generating reference light. As a result, a noise in reference light resulting from intrusion of output light can be reduced, and the output of reference light can be more accurately detected.

Figure 14:
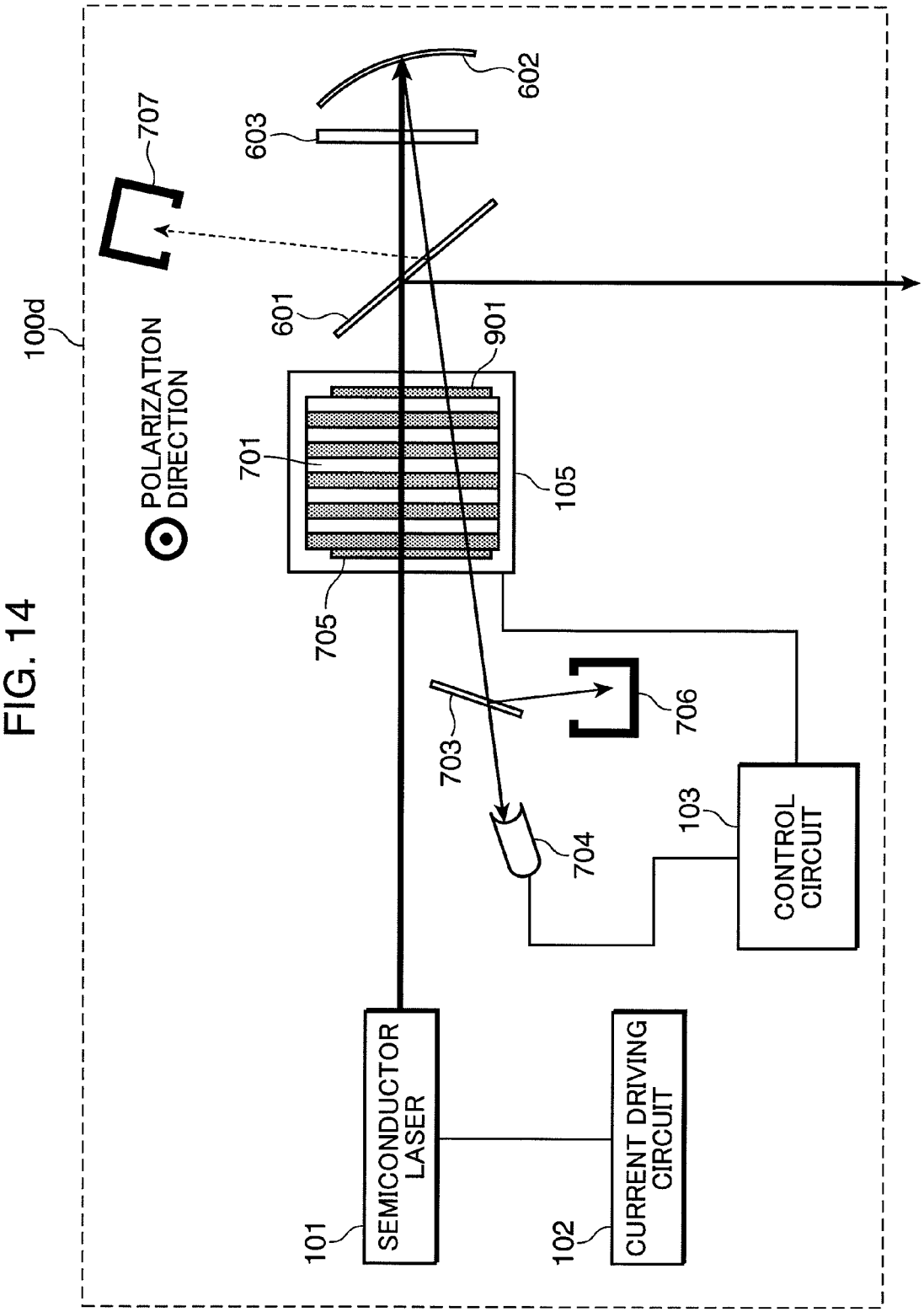
FIG. 14 is a schematic diagram showing still another arrangement of the laser light source in accordance with the second embodiment of the invention.

FIG. 14 is a schematic diagram showing still another arrangement of the laser light source in accordance with the second embodiment of the invention. In the case where a bulk type wavelength converting element is used, use of the following method using a laser light source 100d shown in FIG. 14 also enables to increase the wavelength conversion efficiency on the outgoing path, and increase the S/N ratio of reference light.

Similarly to FIG. 13, the laser light source 100d shown in FIG. 14 is constructed in such a manner that a quasi phase matching wavelength converting element 701 has anti-reflective coats 705 and 901 for transmitting 99% or more of excitation light and wavelength converted light at an incident end and an exit end thereof, respectively, for incidence of excitation light into the quasi phase matching wavelength converting element 701. The excitation light and the wavelength converted light emitted from the exit end of the quasi phase matching wavelength converting element 701 are incident into a light separating mirror 601 for transmitting excitation light and reflecting wavelength converted light. The excitation light transmitted through the light separating mirror 601 is reflected on a concave surface mirror 602 for reflecting excitation light. The excitation light is transmitted through the light separating mirror 601 again for re-incidence into the quasi phase matching wavelength converting element 701. The concave surface mirror 602 is used to suppress scattering of excitation light. The wavelength converted light which is re-incident into the light separating mirror 601 and reflected thereon is incident into a beam stopper 707 and stopped thereat.

The laser light source 100d shown in FIG. 14 is operable to completely separate excitation light and wavelength converted light by allowing light to pass through the light separating mirror 601 for reflecting wavelength converted light. This enables to prevent a likelihood that a part of output light may turn into a noise in reference light, and high-precision control can be performed, even in the case where low-output wavelength conversion where the output of wavelength converted light is as low as about several mW is performed. It is further desirable to provide a wavelength converted light absorbing filter 603 between the light separating mirror 601 and the concave surface mirror 602 to absorb wavelength converted light generated on the incoming path.

(Third Embodiment)

Figure 15:
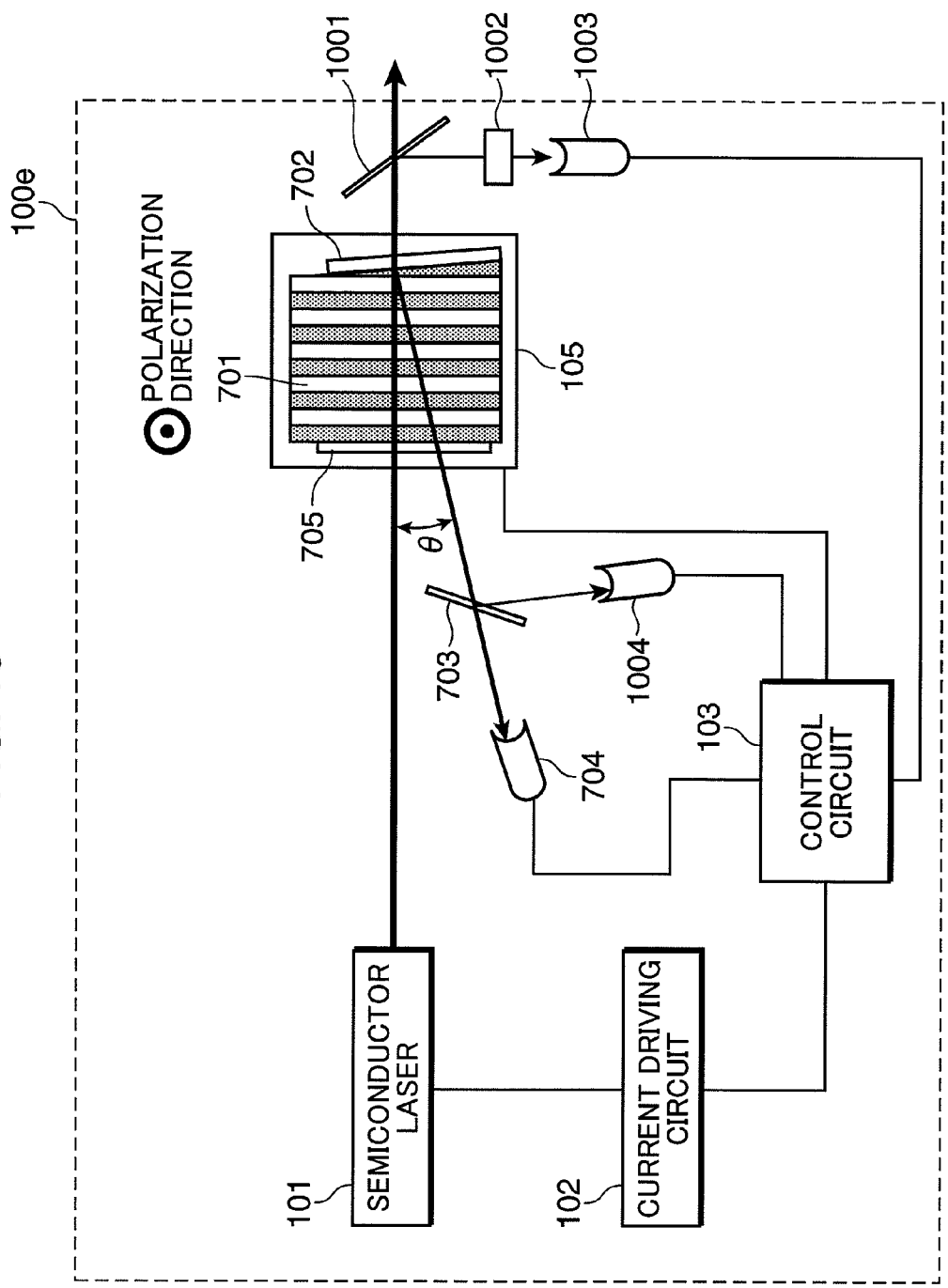
FIG. 15 is a schematic diagram showing an arrangement of a laser light source in accordance with the third embodiment of the invention.

FIG. 15 is a schematic diagram showing an arrangement of a laser light source in accordance with the third embodiment of the invention. In the following, a laser light source, functioning as a wavelength conversion device, in accordance with the third embodiment of the invention is described referring to FIG. 15.

Similarly to the first and the second embodiments, a laser light source 100e shown in FIG. 15 is constructed in such a manner that a semiconductor laser 101 outputs excitation light with a current from a current driving circuit 102. Similarly to the second embodiment, excitation light is incident into a quasi phase matching wavelength converting element 701 to generate output light and reference light, and the output of reference light is monitored by a photodiode 704. Also, the output light is incident into a light splitting mirror 1001 for reflecting about 1% of output light, and the reflected output light is incident into a filter 1002 for absorbing excitation light. After the excitation light intruded in the output light is removed, solely the transmitted output light is monitored by a photodiode 1003.

In this embodiment, similarly to the first embodiment, a control circuit 103 performs output constant control based on the intensity of output light to be monitored, and similarly to the second embodiment, the control circuit 103 performs temperature control using reference light. In this embodiment, performing the above controls enables to constantly stabilize the output in the similar manner as the first embodiment, and enables to make the element temperature and the phase matching temperature substantially coincident with each other in the similar manner as the second embodiment. This enables to prevent deterioration of beams, which may occur when wavelength conversion is performed at a temperature different from the phase matching temperature.

In this embodiment, in the case where the output of excitation light to be generated from the semiconductor laser 101 as an excitation light source is varied to make the intensity of output light constant, the output of reference light at the phase matching temperature of output light may vary. In view of this, it is desirable to monitor the output of excitation light on the outgoing path. Accordingly, in this embodiment, the control circuit 103 is allowed to monitor the output of excitation light on the outgoing path by measuring the output of excitation light to be reflected on a light separating mirror 703 by a photodiode 1004, and summing up the measured output of excitation light, and the output of reference light to be measured by the photodiode 704. This enables to perform output constant control in the similar manner as the first embodiment.

In this embodiment, it is desirable to perform the temperature control as recited in the second embodiment, based on a normalized wavelength conversion efficiency on the outgoing path at the phase matching temperature of output light. In this example, the normalized wavelength conversion efficiency is a value obtained by dividing the reference light output by the square of the excitation light output on the outgoing path.

(Fourth Embodiment)

Figure 16:
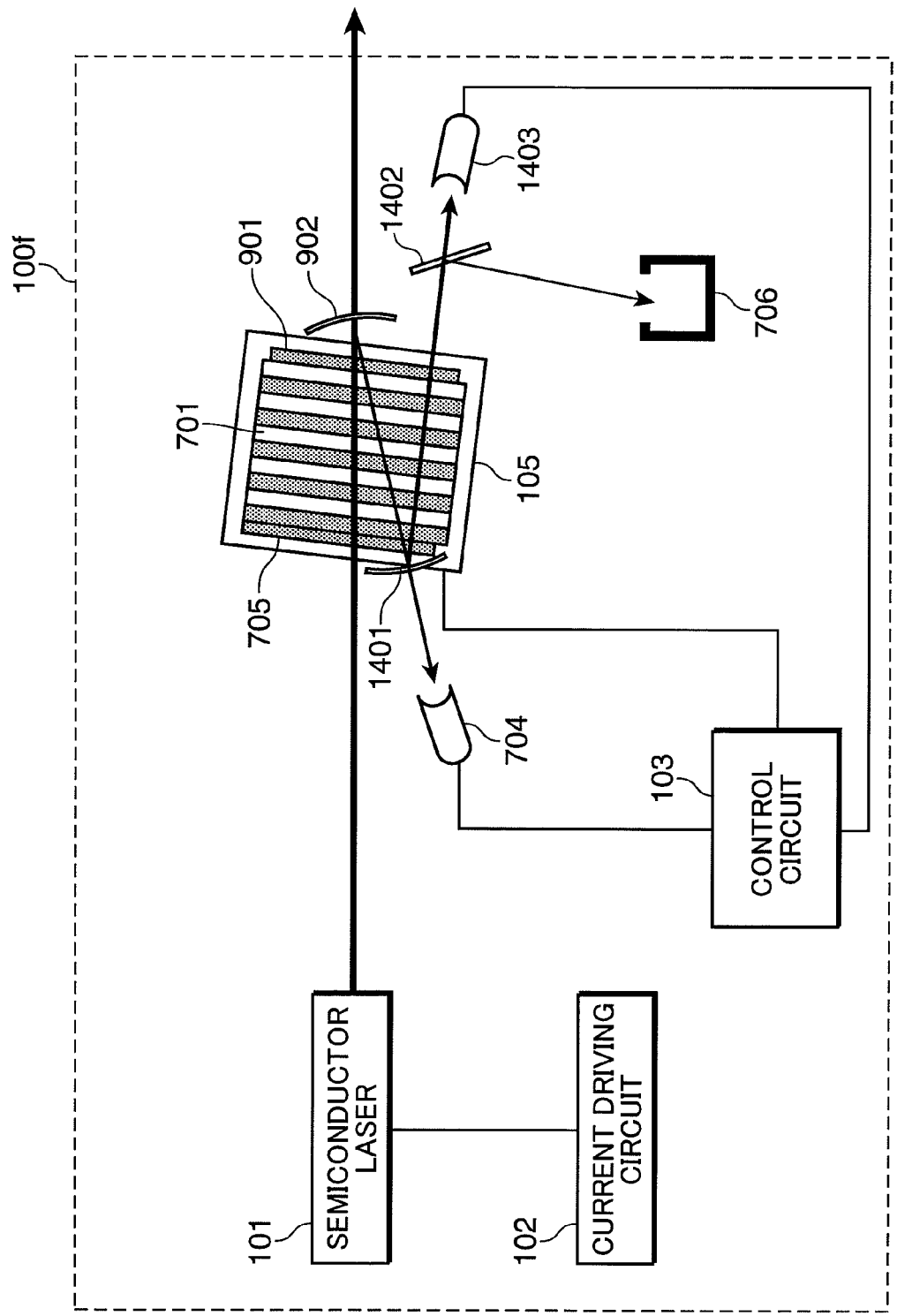
FIG. 16 is a schematic diagram showing an arrangement of a laser light source in accordance with the fourth embodiment of the invention.

FIG. 16 is a schematic diagram showing an arrangement of a laser light source in accordance with the fourth embodiment of the invention. In the following, a laser light source, functioning as a wavelength conversion device, in accordance with the fourth embodiment of the invention is described referring to FIG. 16.

A laser light source 100f shown in FIG. 16 includes light separating mirrors 1401 and 1402, and a photodiode 1403 in addition to the laser light source 100c shown in FIG. 13. In this embodiment, after a part of excitation light is converted into wavelength converted light on the outgoing path in FIG. 16, the wavelength converted light and the excitation light are incident into the light separating mirror 1401 for reflecting excitation light and transmitting wavelength converted light. Similarly to the second embodiment, the wavelength converted light transmitted through the light separating mirror 1401 is incident into a photodiode 704, and the output of wavelength converted light is monitored as an output of first reference light.

On the other hand, the excitation light reflected on the light separating mirror 1401 is incident into a wavelength converting element 701 again. Hereinafter, the optical path, in the wavelength converting element 701, of excitation light incident from a semiconductor laser 101 is called as a first incoming path, and the optical path, in the wavelength converting element 701, of excitation light reflected on the light separating mirror 1401 is called as a second incoming path. A part of excitation light is converted into wavelength converted light on the second incoming path, and emitted from the wavelength converting element 701. Thereafter, the wavelength converted light is incident into the light separating mirror 1402 for reflecting excitation light and transmitting wavelength converted light. The output of wavelength converted light transmitted through the light separating mirror 1402 is monitored by a photodiode 1403 as second reference light. The excitation light reflected on the light separating mirror 1402 is incident into a beam stopper 706 and stopped thereat.

Figure 17:
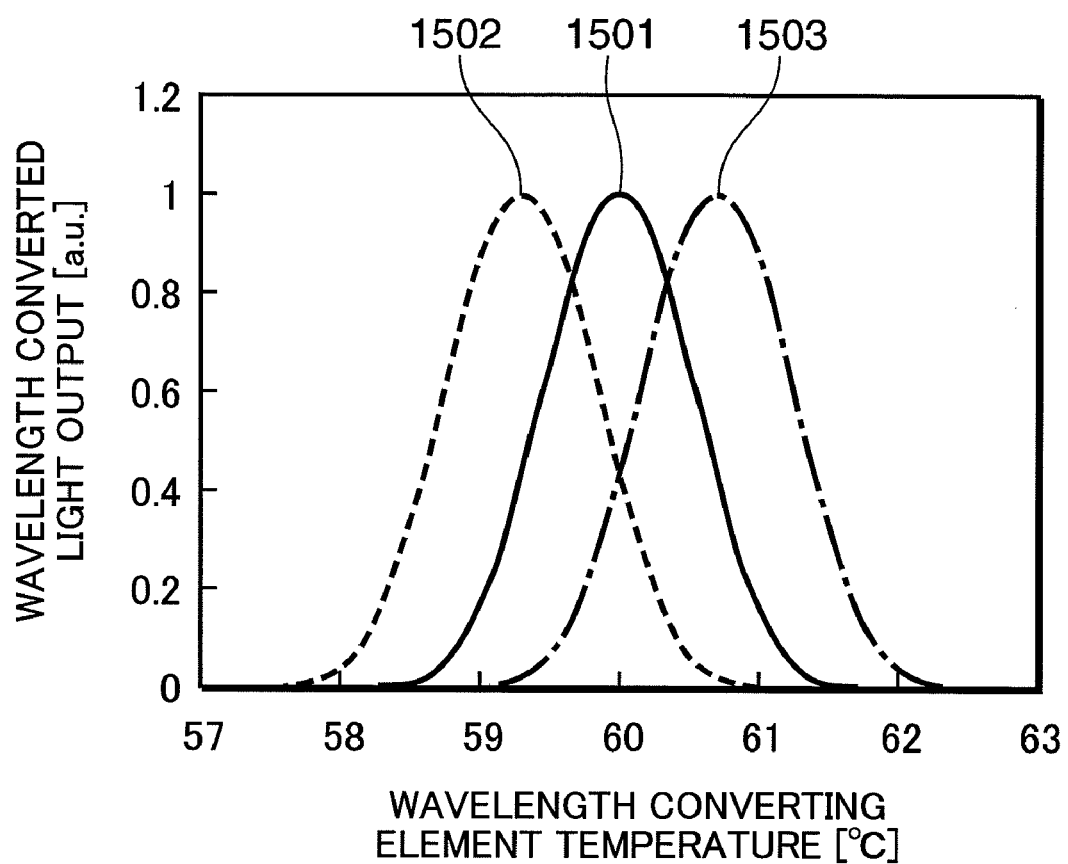
FIG. 17 is a diagram showing a relation between a wavelength converting element temperature, and outputs of output light, first reference light, and second reference light.

In this embodiment, the angles of a light separating mirror 902, the light separating mirror 1401, and the wavelength converting element 701 are adjusted so that the angles defined by the direction of polarization inversion cycle of the wavelength converting element 701; and the first incoming path, the outgoing path, and the second incoming path are set to e.g. 1.00°, 1.44°, and 0.00°, respectively. Thereby, as shown in FIG. 17, a temperature characteristic 1502 (indicated by the broken line in FIG. 17) of first reference light, and a temperature characteristic 1503 (indicated by the one-dotted chain line in FIG. 17) of second reference light are respectively shifted to a low temperature side and a high temperature side with respect to a temperature characteristic 1501 (indicated by the solid line in FIG. 17) of output light by 0.7° C., and overlapped with the temperature characteristic 1501.

In this embodiment, the outputs of first reference light and second reference light are monitored, and the wavelength converting element 701 is heated or cooled by a heater 105 to maximize the output of output light. For instance, the output ratio between the first reference light and the second reference light is measured in advance at a wavelength converting element temperature where the intensity of output light is maximized; the control circuit 103 stores the output ratio in advance; and the temperature of the wavelength converting element 701 is adjusted to make the output ratio between the first reference light and the second reference light close to the stored value. In the example shown in FIG. 17, the control circuit 103 performs a control operation of increasing the temperature of the wavelength converting element 701, in the case where the output ratio (output of first reference light/output of second reference light) is larger than the stored value; and performs a control operation of decreasing the temperature of the wavelength converting element 701, in the case where the output ratio is smaller than the stored value.

In this embodiment, high-precision temperature control can be performed, even if the wavelength conversion efficiency on the incoming path, or the output of excitation light that has not been subjected to wavelength conversion on the incoming path is varied to perform temperature control of the wavelength converting element 701 based on the output ratio (output of first reference light/output of second reference light).

Similarly to the second embodiment, it is desirable to use a quasi phase matching wavelength converting element containing lithium niobate or lithium tantalate as a primary component, as the wavelength converting element 701. This enables to perform high-precision wavelength conversion. Since use of a quasi phase matching wavelength converting element makes it easy to partially adjust the cycle of the cyclic polarization inversion structure, or partially form a portion where a cyclic polarization inversion structure is not formed, the phase matching temperatures of the first reference light and the second reference light, and the allowable temperature range can be freely adjusted. A wavelength converting element using lithium niobate or lithium tantalate may likely cause output variation resulting from a temperature change due to absorption of excitation light or wavelength converted light. Use of the above arrangement in this embodiment, however, enables to obtain stable output.

In use of a birefringent phase matching wavelength converting element, the phase matching temperature can also be changed by changing the angle between the polarization direction of excitation light, and the optical axis of the crystal. Accordingly, it is possible to obtain first reference light and second reference light whose phase matching temperatures are different from the phase matching temperature of output light. Thus, temperature adjustment similar to the above can be performed. In particular, this embodiment is advantageous in using a birefringent phase matching wavelength converting element such as an LBO-substrate having an excellent high-output wavelength conversion characteristic, or an inexpensive KTP-substrate.

It is desirable to set the outputs of first reference light and second reference light to not smaller than 15% and not larger than 85% of the respective maximum values thereof, when the element temperature coincides with the phase matching temperature of output light, and the intensity of the output light is maximized. Setting the outputs of first reference light and second reference light to not smaller than 15% and not larger than 85% of the respective maximum values thereof enables to perform high-precision temperature control, with a sufficiently high S/N ratio. It is further desirable to set the outputs of first reference light and second reference light to not smaller than 30% and not larger than 60% of the respective maximum values thereof. Thereby, since output variation of the first reference light and the second reference light with respect to a temperature change can be made sufficiently large, high-speed temperature control can be performed, and output variation of the output light can be further reduced.

In the case where the output light is intruded in the first reference light and the second reference light, or in the case where the first reference light is intruded in the second reference light, high-precision temperature control cannot be performed. In view of this, in this embodiment, it is desirable to set the reflectances of the light separating mirrors 902 and 1401 with respect to wavelength converted light to 5% or less so as to prevent intrusion of light.

In this embodiment, it is particularly desirable to use a wavelength converting element having a slab waveguide path where alignment is easy, or a bulk type wavelength converting element (without a waveguide path) to form three optical paths (the first incoming path, the outgoing path, and the second incoming path) of excitation light in the wavelength converting element 701. In particular, in the case where the wavelength converted light output is 10 W or less, use of a wavelength converting element having a slab waveguide path makes it easy to secure an intensity of excitation light on the outgoing path, and enables to obtain high conversion efficiency from excitation light into wavelength converted light on the outgoing path. Thereby, the S/N ratio of the first reference light and the second reference light can be made sufficiently high.

In the case where excitation light of a wavelength not larger than 1200 nm is incident for conversion into wavelength converted light of a wavelength not larger than 600 nm, with use of a wavelength converting element made of lithium niobate or lithium tantalate, a wavelength converted light output in excess of 500 mW may cause a temperature difference between the first incoming path, the outgoing path, and the second incoming path, resulting from an exothermic operation due to light absorption in the wavelength converting element. This temperature difference may become a noise in the control of this embodiment. In view of this, it is desirable to use a bulk type wavelength converting element capable of easily reducing influences of light absorption and temperature increase resulting from the light absorption by increasing the beam diameter.

In the case where a bulk type wavelength converting element is used, the wavelength conversion efficiencies on the outgoing path and the second incoming path can be increased by adjusting the curvatures of the light separating minors 902 and 1401. This enables to increase the S/N ratio of the first reference light and the second reference light.

Figure 18:
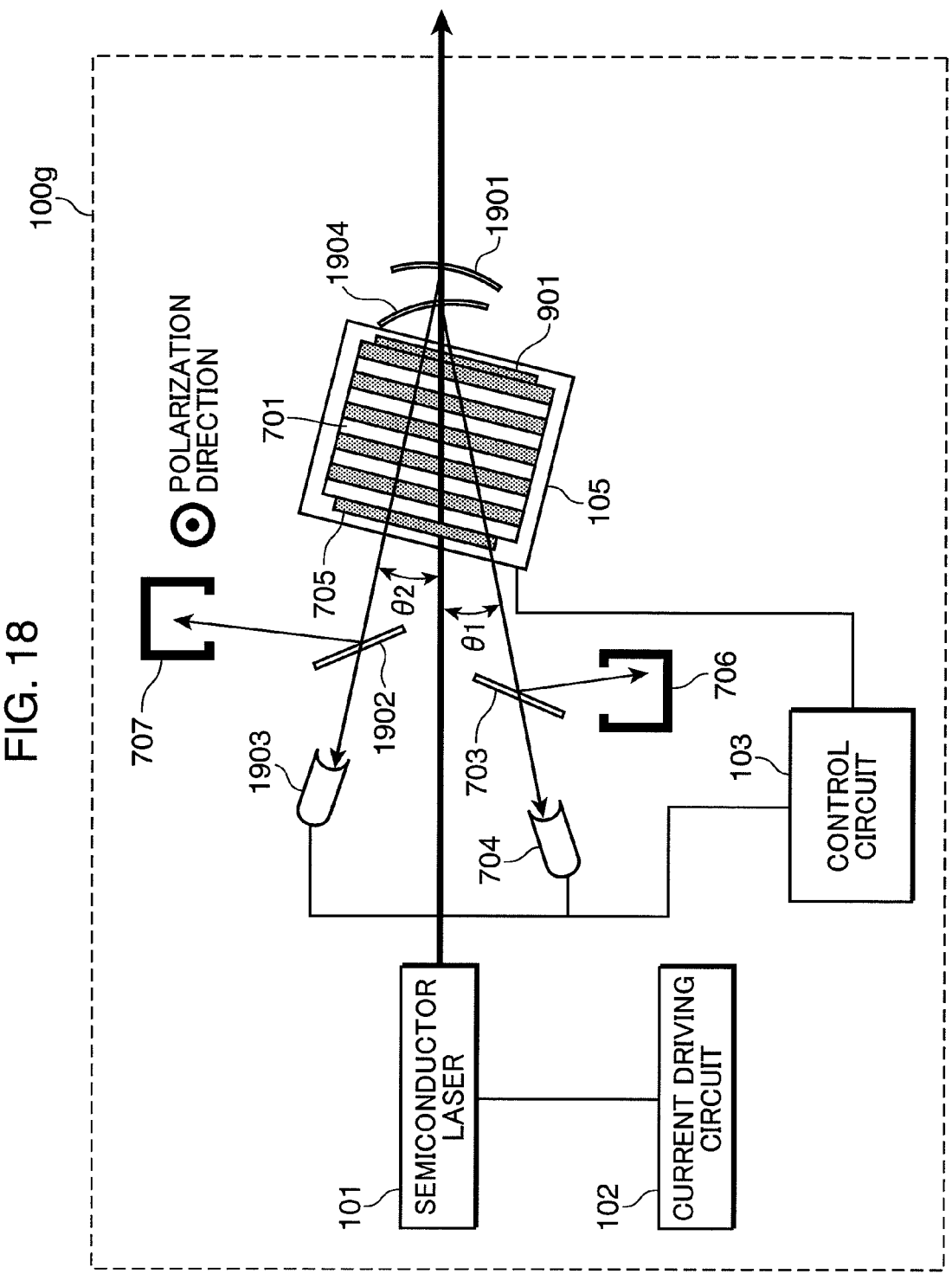
FIG. 18 is a schematic diagram showing another arrangement of the laser light source in accordance with the fourth embodiment of the invention.

There is proposed an arrangement as shown in FIG. 18, as still another arrangement of this embodiment. FIG. 18 is a schematic diagram showing yet another arrangement of the laser light source in accordance with the fourth embodiment of the invention.

A laser light source 100g shown in FIG. 18 is constructed in such a manner that excitation light to be emitted from a semiconductor laser 101 is incident into a wavelength converting element 701, and a part of the excitation light is converted into wavelength converted light. Thereafter, solely the excitation light is split into first excitation light and second excitation light, using concave surface mirrors 1904 and 1901 for re-incidence into the wavelength converting element 701. In this example, for instance, the concave surface mirror 1904 transmits 99% or more of wavelength converted light, and reflects about 50% of excitation light to emit the first excitation light, and the concave surface mirror 1901 transmits 99% or more of wavelength converted light, and reflects 99% or more of excitation light to emit the second excitation light.

The first excitation light and the second excitation light are respectively converted into first wavelength converted light and second wavelength converted light in the wavelength converting element 701. The first wavelength converted light and the second wavelength converted light are transmitted through light separating mirrors 703 and 1902 for reflecting excitation light and transmitting wavelength converted light, and monitored by photodiodes 704 and 1903 as first reference light and second reference light, respectively. The excitation light reflected on the light separating mirrors 703 and 1902 is incident into beam stoppers 706 and 707 and stopped thereat.

In this embodiment, similarly to the example shown in FIG. 16, the angles of the concave surface mirrors 1904 and 1901, and the wavelength converting element 701 are adjusted so that the angles defined by the direction of polarization inversion cycle of the wavelength converting element 701; and excitation light (the incoming path) emitted from the semiconductor laser 101, the first excitation light (the first outgoing path) reflected on the concave surface mirror 1904, and the second excitation light (the second outgoing path) reflected on the concave surface mirror 1901 are set to e.g. 1.00° (=θ2), 1.44° (=θ2+θ1), and 0.00°, respectively. Thus, it is needless to say that the example shown in FIG. 18 has an effect similar to the example shown in FIG. 16. In this arrangement, since the output ratio of excitation light on the two outgoing paths is made constant, precision for temperature control based on the output ratio of the two reference light can be improved, and high-efficient and stable output light can be more advantageously obtained.

(Fifth Embodiment)

Figure 19:
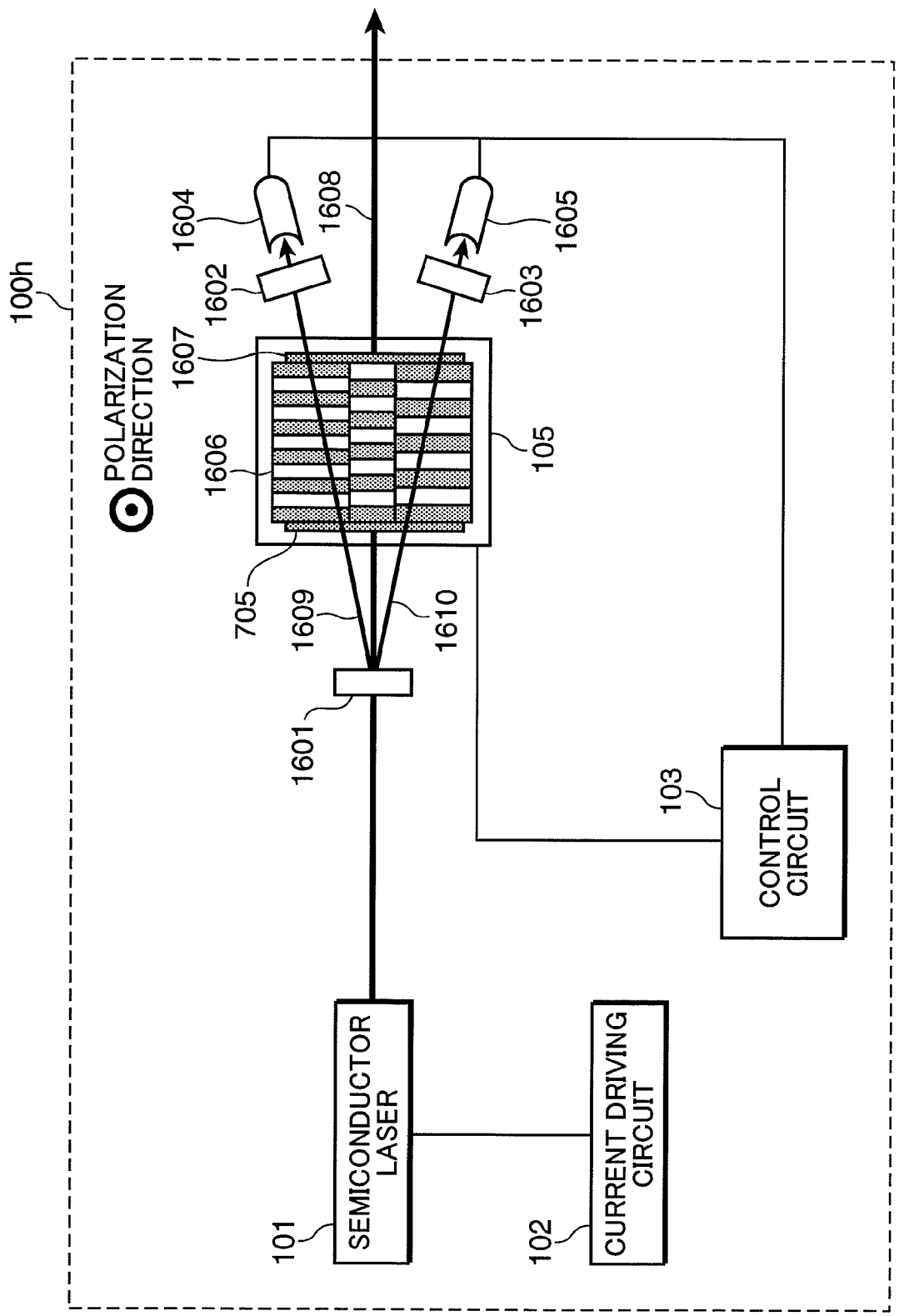
FIG. 19 is a schematic diagram showing an arrangement of a laser light source in accordance with the fifth embodiment of the invention.

FIG. 19 is a schematic diagram showing an arrangement of a laser light source in accordance with the fifth embodiment of the invention. In the following, a laser light source, functioning as a wavelength conversion device, in accordance with the fifth embodiment of the invention is described referring to FIG. 19.

A laser light source 100*h* shown in FIG. 19 includes a semiconductor laser 101, a current driving circuit 102, a control circuit 103, a heater 105, a diffraction optical element 1601, excitation light absorbing filters 1602 and 1603, photodiodes 1604 and 1605, a quasi phase matching wavelength converting element 1606, and anti-reflective coats 705 and 1607.

Similarly to the second embodiment, the semiconductor laser 101 generates excitation light with a current from the current driving circuit 102. In this embodiment, excitation light is first incident into the diffraction optical element 1601, and split into three directions of a main optical path 1608, and auxiliary optical paths 1609 and 1610. In this example, the power ratio of excitation light between the main optical path 1608 and the auxiliary optical paths 1609 and 1610 is set to e.g. 98:1:1.

Excitation light on the main optical path 1608, where the output is largest i.e. 98% of the output of excitation light after splitting, is incident into the wavelength converting element 1606. A part of the excitation light is converted into wavelength converted light, and emitted to the exterior of the laser light source 100*h* as output light. Excitation light on the auxiliary optical paths 1609 and 1610 is incident into the wavelength converting element 1606, where a part of the excitation light is converted into wavelength converted light. The wavelength converted light on the auxiliary optical paths 1609 and 1610 is transmitted through the excitation light absorbing filters 1602 and 1603, and the outputs of the wavelength converted light are measured by the photodiodes 1604 and 1605, as reference light, respectively. In this example, the excitation light absorbing filters 1602 and 1603 absorb excitation light and transmit wavelength converted light.

In this embodiment, temperature characteristics of excitation light on the main optical path 1608, and the auxiliary optical paths 1609 and 1610 are allowed to have relations of the temperature characteristics 1501, 1503, and 1502 shown in FIG. 17, respectively, by changing the polarization inversion cycle of the quasi phase matching wavelength converting element 1606 with respect to each of the portions (an intermediate portion where excitation light on the main optical path 1608 passes, an upper portion where excitation light on the auxiliary optical path 1609 passes, and a lower portion where excitation light on the auxiliary optical path 1610 passes). In other words, control similar to the control in the fourth embodiment can be performed.

In this embodiment, since the power ratio of excitation light to be incident into the main optical path and the auxiliary optical paths is made constant, high-precision temperature control can be performed, even in a condition that output variation of excitation light is large. Also, forming the anti-reflective coats 705 and 1607 for preventing reflection of excitation light and wavelength converted light on an incident surface and an exit surface of the wavelength converting element 1606 enables to prevent incidence of unwanted wavelength converted light other than the wavelength converted light generated on the auxiliary optical paths 1609 and 1610 into the photodiodes 1604 and 1605. This enables to perform high-precision control.

In this embodiment, two auxiliary optical paths are formed. Alternatively, one or more auxiliary optical paths may be formed. Similarly to the fourth embodiment, use of two or more auxiliary optical paths enables to perform temperature control using a control circuit 103 and a heater 105 based on the output ratio of two reference light. This is more advantageous in performing high-precision temperature control.

In this embodiment, a wavelength converting element having polarization inversion cycles different from each other with respect to the portions is used. Alternatively, similarly to the fourth embodiment, the angles defined by the polarization inversion cycle; and the main optical path, and the two auxiliary optical paths may be adjusted. A method of changing the phase matching temperature by changing the angles between the polarization inversion cycle and the respective optical paths enables to adjust the phase matching temperature with high precision, as compared with a method of changing the phase matching temperature by changing the polarization inversion cycle.

In the case where the angle difference is too small, and it is difficult to separate wavelength converted light on the optical paths, as described in the second embodiment, it is more desirable to use a method of adjusting both the polarization inversion cycles on optical paths, and the angles with respect to the direction of polarization inversion cycle. The modification is applied in the case where the angle between the main optical path and the respective auxiliary optical paths is 10° or less, although the application depends on the size of a light source.

(Sixth Embodiment)

Figure 20:
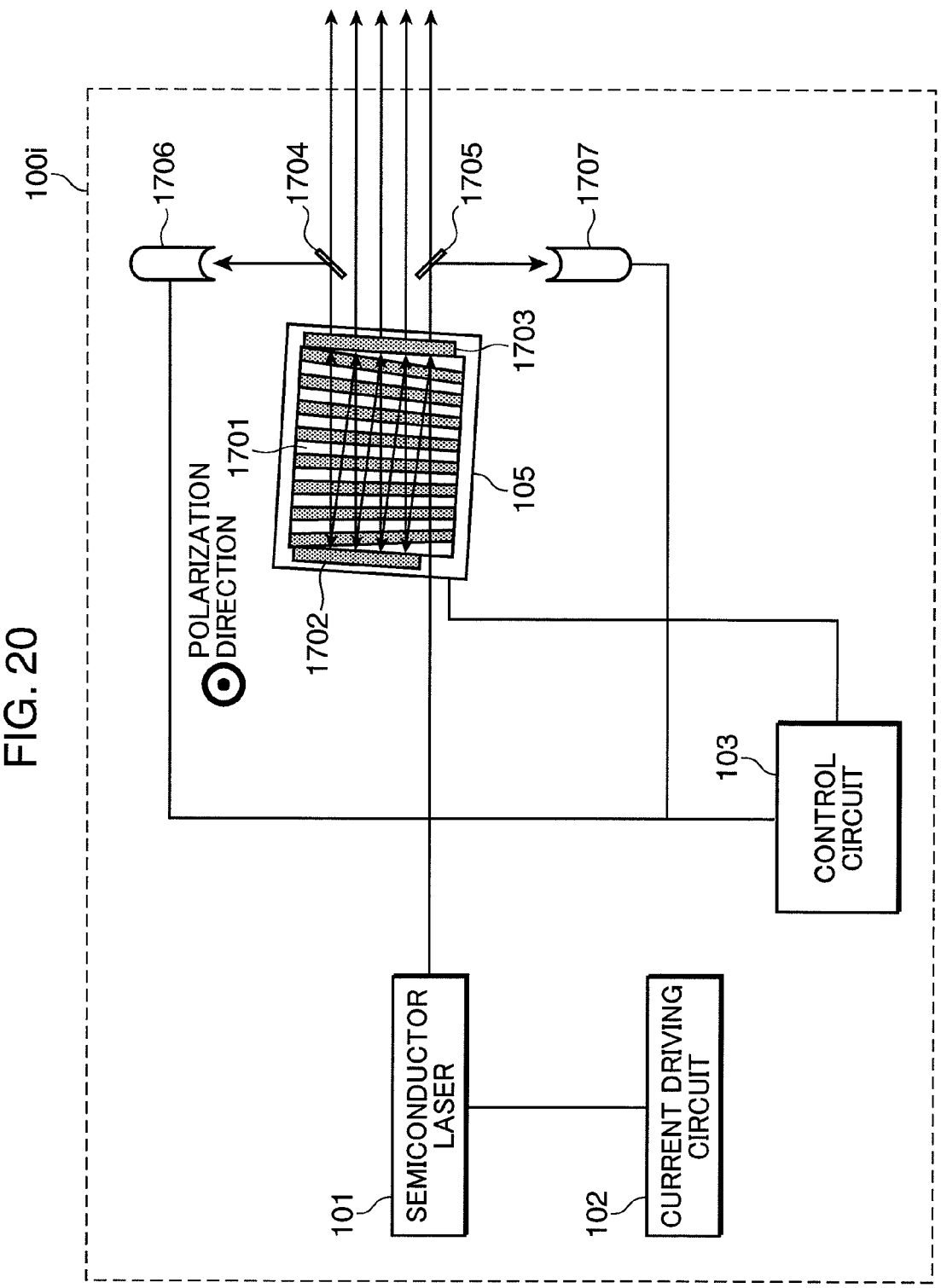
FIG. 20 is a schematic diagram showing an arrangement of a laser light source in accordance with the sixth embodiment of the invention.

FIG. 20 is a schematic diagram showing an arrangement of a laser light source in accordance with the sixth embodiment of the invention. In the following, a laser light source, functioning as a wavelength conversion device, in accordance with the sixth embodiment of the invention is described referring to FIG. 20.

A laser light source 100*i* shown in FIG. 20 includes a semiconductor laser 101, a current driving circuit 102, a control circuit 103, a heater 105, a quasi phase matching wavelength converting element 1701, a light reflecting coat 1702, a light separating coat 1703, light splitting mirrors 1704 and 1705, and photodiodes 1706 and 1707.

Similarly to the second embodiment, the semiconductor laser 101 generates excitation light with a current from the current driving circuit 102. In this embodiment, excitation light is incident into the quasi phase matching wavelength converting element 1701, and subjected to multiple reflections between the light reflecting coat 1702 and the light separating coat 1703 formed on both ends of the quasi phase matching wavelength converting element 1701, thereby forming multiple optical paths. In this example, the light reflecting coat 1702 reflects both excitation light and wavelength converted light, and the light reflecting coat 1703 reflects excitation light and transmits wavelength converted light. Accordingly, wavelength converted light generated on the optical paths is emitted from the end surface of the wavelength converting element 1701 where the light separating coat 1703 is formed. A part of the emitted wavelength converted light is split by the light splitting mirrors 1704 and 1705, and incident into the photodiodes 1706 and 1707, and the outputs of the wavelength converted light are monitored by the photodiodes 1706 and 1707.

Figure 21:
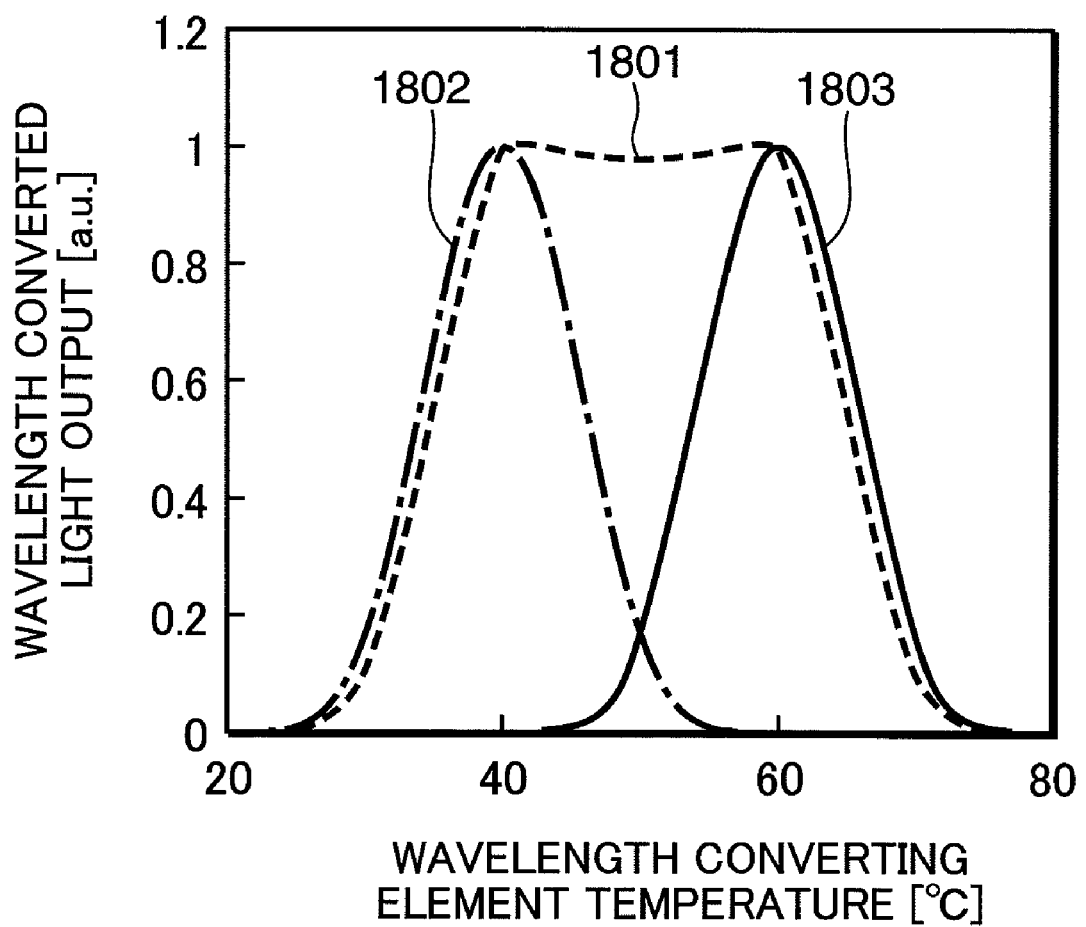
FIG. 21 is a diagram showing a relation between a wavelength converting element temperature, and outputs of output light and two reference light.

In the laser light source 100*i* of this embodiment, the phase matching temperatures on the optical paths are gradually changed by changing the polarization inversion cycle of the quasi phase matching wavelength converting element 1701 with respect to the optical paths (for instance, by reducing the polarization inversion cycle, as the optical path is shifted from the upper portion to the lower portion). As a result of performing this operation, as shown in FIG. 21, a temperature characteristic 1801 of the total power of output light becomes a stable temperature characteristic from 40° C. to 60° C. This enables to suppress a change in output with respect to a temperature change, and realize a laser light source having an stable output in an environment where the temperature change is large.

In the above control, since the temperature characteristic 1801 of the total power becomes a substantially flat characteristic from 40° C. to 60° C., it is impossible to predict the temperature of the quasi phase matching wavelength converting element 1701 based on a value of output light, and judge whether the wavelength converting element 1701 should be heated or cooled while the element temperature is from 40° C. to 60° C. In view of this, in this embodiment, parts of wavelength converted light generated on an optical path having a lowest phase matching temperature, and an optical path having a highest phase matching temperature are incident into the photodiodes 1706 and 1707, respectively, and the outputs of the wavelength converted light are monitored by the photodiodes 1706 and 1707. As shown in FIG. 21, temperature characteristics 1802 and 1803 of reference light to be incident into the photodiodes 1706 and 1707 are maximized at 40° C. and 60° C., respectively. In other words, monitoring the outputs of the two reference light enables to judge whether the quasi phase matching wavelength converting element 1701 should be heated or cooled before when the element temperature becomes 40° C. or lower, or 60° C. or higher where the output light starts to lower.

In this embodiment, since the optical path of excitation light in the wavelength converting element 1701 is long, the beam diameter of laser light may be increased by diffraction, and the wavelength conversion efficiency may be lowered. In view of this, it is desirable to use a wavelength converting element having a slab waveguide path, as the wavelength converting element 1701. In this arrangement, since an influence of diffraction in one direction can be reduced, high wavelength conversion efficiency can be obtained.

In the arrangements of the first through the sixth embodiments, it is desirable to form the optical paths in the wavelength converting element away from the heater (a member for adjusting the temperature of a wavelength converting element) by substantially the same distance. In view of this, the heaters in the first through the sixth embodiments are disposed on a side surface (a rear surface) of the wavelength converting element in parallel to the plane of the corresponding drawing. This enables to reduce a temperature difference between the optical paths, and improve precision for temperature control. The surface on which the heater is placed is not specifically limited to the above example, but various modifications are applicable.

(Seventh Embodiment)

Figure 22:
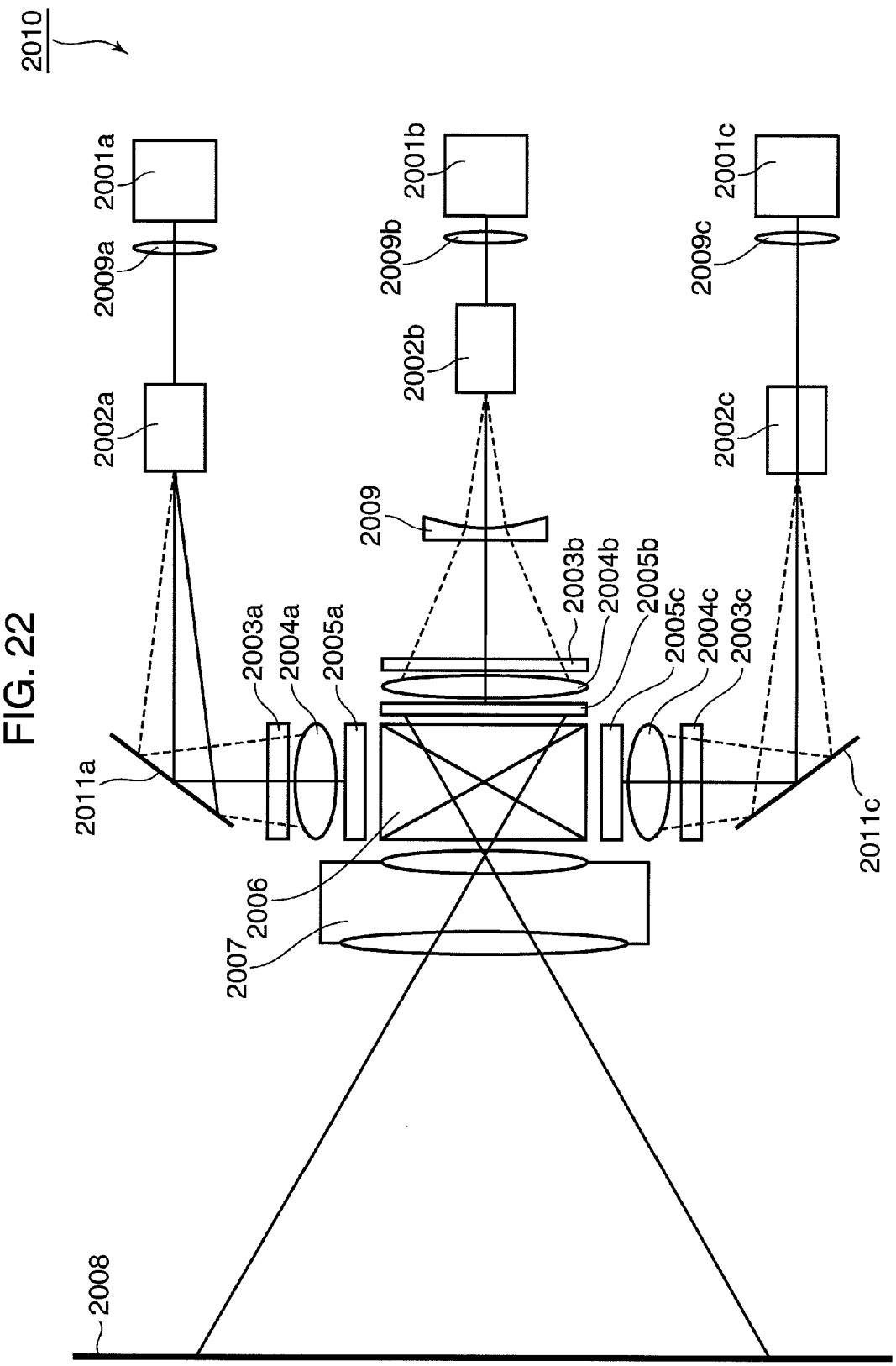
FIG. 22 is a schematic construction diagram showing an example of an arrangement of an image display apparatus in accordance with the seventh embodiment of the invention.

FIG. 22 is a schematic construction diagram showing an example of an arrangement of an image display apparatus in accordance with the seventh embodiment of the invention.

As shown in FIG. 22, an image display apparatus 2010 of this embodiment includes laser light sources 2001*a*, 2001*b*, and 2001*c*; and scanning portions 2002*a*, 2002*b*, and 2002*c* for scanning laser beams from the laser light sources 2001*a*, 2001*b*, and 2001*c*. The red (R) laser light source 2001*a*, the green (G) laser light source 2001*b*, and the blue (B) laser light source 2001*c* are used as light sources. A semiconductor laser apparatus made of AlGaInP/GaAs-based material for emitting light of 640 nm wavelength is used as the red laser light source (R light source) 2001*a*, and a semiconductor laser apparatus made of GaN-based material for emitting light of 450 nm wavelength is used as the blue laser light source (B light source) 2001*c*. The laser light source described in one of the first through the sixth embodiments is used as the green laser light source (G light source) 2001*b*, specifically, a wavelength conversion device for emitting laser light of 532 nm wavelength is used.

Laser beams emitted from the R light source 2001*a*, the G light source 2001*b*, and the B light source 2001*c* in the image display apparatus 2010 are condensed by condenser lenses 2009*a*, 2009*b*, and 2009*c*, and then scanned on diffusers 2003*a*, 2003*b*, and 2003*c* by the reflective two-dimensional beam scanners 2002*a*, 2002*b*, and 2002*c* constituting a scanning section. Image data is divided into R data, G data, and B data. Signals corresponding to the RGB data are inputted to spatial modulators 2005*a*, 2005*b*, and 2005*c*. The laser beams from the diffusers 2003*a*, 2003*b*, and 2003*c* are converged by field lenses 2004*a*, 2004*b*, and 2004*c*, subjected to modulation by the spatial modulators 2005*a*, 2005*b*, and 2005*c* depending on the image data, and then combined by a dichroic prism 2006, whereby a color image is formed. The color image is projected onto a screen 2008 through a projection lens 2007.

A concave lens 2009 is provided on the optical path from the G light source 2001*b* to the spatial modulator 2005*b* to make the spot size of G light through the spatial modulator 2005*b* identical to that of R light and B light. The G light source 2001*b* is constructed by adding an optical component such as a condenser lens (not shown) to the G light source described in one of the first through the sixth embodiments to condense output beams as multi-beams. Thereby, the G light source 200 1*b* can be easily scanned by the reflective two-dimensional scanner 2002*b*. A mirror 2011*a* is provided between the reflective two-dimensional beam scanner 2002*a* and the diffuser 2003*a*, and a mirror 2011*c* is provided between the reflective two-dimensional beam scanner 2002*c* and the diffuser 2003*c*.

In the image display apparatus 2010 of this embodiment, the G light source described in one of the first through the sixth embodiments is used as the G light source 2001*b*. Specifically, the image display apparatus 2010 includes the screen 2008, the laser light sources 2001*a*, 2001*b*, and 2001*c*, and the scanning portions 2002*a*, 2002*b*, and 2002*c* for scanning laser beams from the laser light sources 2001*a*, 2001*b*, and 2001*c*. The laser light sources 2001*a*, 2001*b*, and 2001*c* are light sources for emitting laser light of at least red, green, and blue, respectively. At least the green light source (G light source) 2001c out of the laser light sources 2001a, 2001b, and 200c is the laser light source described in one of the first through the sixth embodiments.

The above arrangement enables to realize an image display apparatus having excellent color reproducibility, stability and low electric power consumption. Alternatively, the screen 2008 may be omitted from the arrangement of the image display apparatus 2010 of this embodiment to directly form an image in the retina. The modification enables to display a wide-angle image by a compact apparatus having low electric power consumption.

(Eighth Embodiment)

Figure 23:
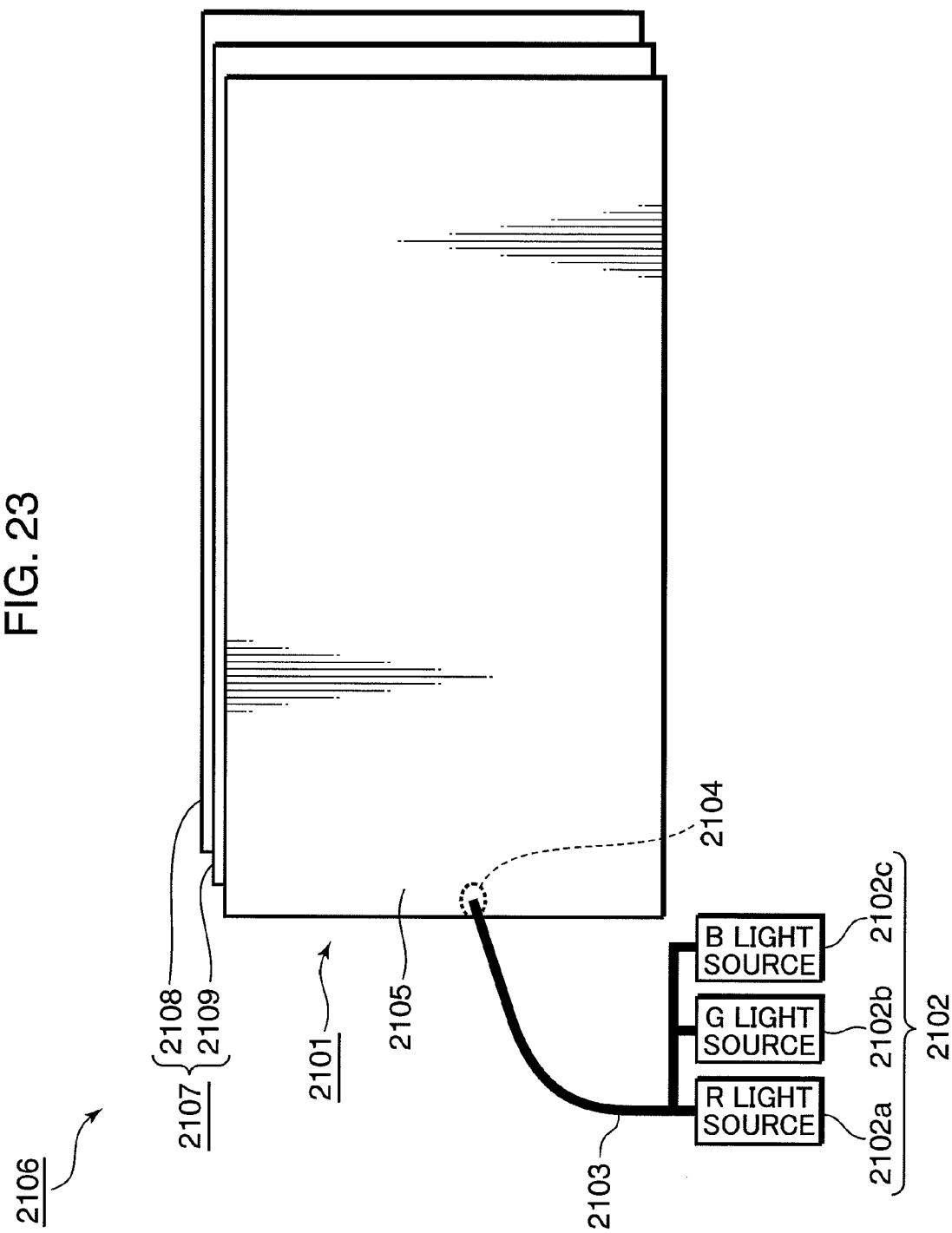
FIG. 23 is a schematic construction diagram showing an example of an arrangement of an image display apparatus in accordance with the eighth embodiment of the invention.

FIG. 23 is a schematic construction diagram showing an example of an arrangement of an image display apparatus in accordance with the eighth embodiment of the invention. In this embodiment, a schematic arrangement of a liquid crystal display apparatus 2106 is described as an example of the image display apparatus. The liquid crystal display apparatus 2106 is incorporated with a backlight illumination device 2101 including the laser light source described in one of the first through the sixth embodiments, as a G light source.

As shown in FIG. 23, the liquid crystal display apparatus 2106 includes a liquid crystal display panel 2107 as a spatial modulator, and the backlight illumination device 2101 for illuminating the liquid crystal display panel 2107 from the rear side thereof. The light source of the backlight illumination device 2101 is constituted of a laser light source unit 2102. The laser light source unit 2102 includes at least an R light source 2102a, a G light source 2102b, and a B light source 2102c for emitting laser light of at least red, green and blue, respectively. Specifically, the R light source 2102a, the G light source 2102b, and the B light source 2102c respectively emit red, green and blue laser light. A G light source constituted of the laser light source described in one of the first through the sixth embodiments is used as the G light source 2102b out of the laser light source unit 2102.

In this example, a semiconductor laser apparatus made of AlGaInP/GaAs-based material for emitting light of 640 nm wavelength is used as the R light source 2102a, and a semiconductor laser apparatus made of GaN-based material for emitting light of 450 nm wavelength is used as the blue laser light source (B light source) 2102c. The laser light source described in one of the first through the sixth embodiments is used as the green laser light source (G light source) 2102b, specifically, a wavelength conversion device for emitting laser light of 532 nm wavelength is used.

Next, an arrangement of the liquid crystal display apparatus 2106 in this embodiment is specifically described. The liquid crystal display apparatus 2106 in this embodiment is comprised of the backlight illumination device 2101; and the liquid crystal display panel 2107 constituted of a polarization plate 2108 for displaying an image, utilizing laser light of R light, G light, and B light to be emitted from the backlight illumination device 2101, and a liquid crystal plate 2109.

The backlight illumination device 2101 is constituted of an optical fiber 2103 for guiding a bundle of laser light of R light, G light, and B light from the R light source 2102a, the G light source 2102b, and the B light source 2102c to a light guiding plate 2105 through a light guiding portion 2104, and the light guiding plate 2105 having a primary plane (not shown) uniformly filled with the guided laser light of R light, G light, and B light to emit the laser light. The G light source 2102b is constructed by adding an optical component such as a condenser lens (not shown) to the laser light source described in one of the first through the sixth embodiments to condense output light as multi-beams through the optical fiber 2103 so as to guide the multi-beams to the light guiding plate 2105.

Thus, this embodiment enables to realize an image display apparatus having excellent color reproducibility, stability and low electric power consumption. In the foregoing, a liquid crystal display apparatus incorporated with a transparent liquid crystal panel as a spatial modulator is described as an image display apparatus incorporated with a laser light source. It is needless to say that an effect similar to the above can be obtained in an image display apparatus such as a projector, wherein a DMD mirror or a reflective LCOS is used as a spatial modulator.

(Ninth Embodiment)

Figure 24:
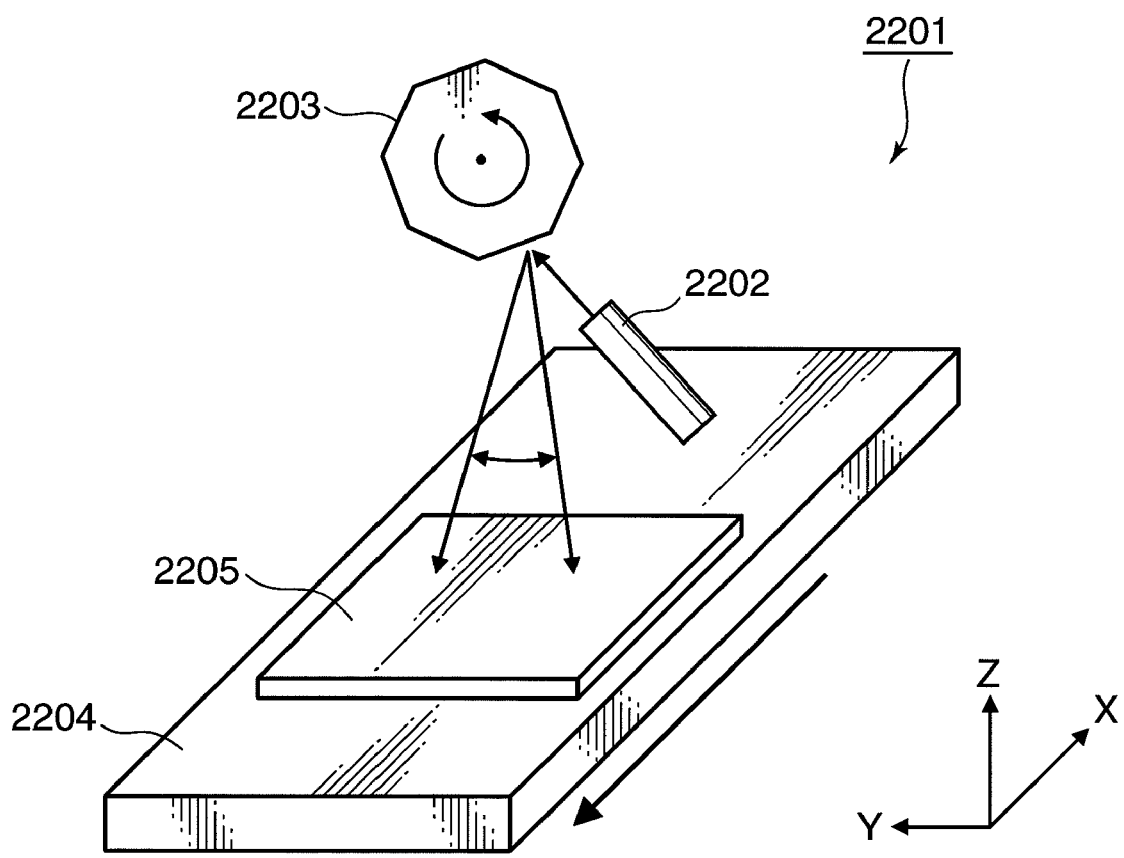
FIG. 24 is a schematic construction diagram showing an example of an arrangement of a processing apparatus in accordance with the ninth embodiment of the invention.

FIG. 24 is a schematic construction diagram showing an example of an arrangement of a laser processing apparatus in accordance with the ninth embodiment of the invention. In this example, the laser processing apparatus is incorporated with the laser light source described in one of the first through the sixth embodiments.

As shown in FIG. 24, a laser processing apparatus 2201 is constituted of a laser light source 2202, a scan mirror 2203, and a stage 2204, and is adapted to process a sample 2205. The laser light source 2202 is constituted of the laser light source described in one of the first through the sixth embodiments. Laser light emitted from the laser light source 2202 is irradiated on the sample 2205 while being reflected on the scan mirror 2203 to move the laser irradiation position on the sample 2205 in Y-axis direction. Simultaneously, the stage 2204 carrying the sample 2205 is moved in X-axis direction to move the laser irradiation position on the sample 2205 in X-axis direction.

In the above arrangement, for instance, irradiating laser light at an intended laser irradiation position while pulse-oscillating the laser light source 2202 enables to perform a marking operation of forming an intended pattern on a surface of the sample 2205. Similarly to the above, placing the sample 2205 in a water tank and pulse-irradiating laser light onto the surface of the sample 2205 enables to apply the laser processing apparatus for laser peening or a like technology.

As described above, the laser light sources described in the first through the sixth embodiments enable to generate laser light having a stable and high beam quality, and are desirable as a light source for use in a laser processing apparatus for laser marking, laser peening, or a like technology.

It is desirable to use a laser light source for generating light of a wavelength not smaller than 441 nm and not larger than 592 nm as wavelength converted light in laser peening. This enables to prevent water vaporization resulting from water absorption by laser light, and obtain a high laser peening effect on the irradiation surface of the sample 2205.

In this embodiment, described is a laser scanner type processing apparatus using a scan mirror. This is merely an example of the processing apparatus using a laser light source. For instance, there is proposed a processing apparatus constructed in such a manner that laser light generated in a laser light source is incident into an optical fiber, and the laser light is irradiated onto an intended irradiation surface opposing to the other end (exit end) of the optical fiber. This arrangement enables to realize a laser processing apparatus for surgery.

In the case where wavelength converted light generated by wavelength conversion is used as light to be incident into an optical fiber, it is desirable to use a laser light source having an excellent beam quality i.e. $M^2$ (M square) of 1.4 or less to suppress insertion loss in incidence into the optical fiber.

Further, the arrangements described in the forgoing embodiments in the specification are merely examples, and it is needless to say that various modifications are applicable as far as such modifications do not depart from the gist of the invention.

The following is a summary of the embodiments of the invention. Specifically, a laser light source according to an aspect of the invention includes: an excitation light source; a wavelength converting element made of a non-linear optical crystal and having multiple optical paths along which excitation light from the excitation light source passes, for generating output light having a first temperature characteristic and adapted to be emitted to the exterior of the laser light source, and reference light having a second temperature characteristic different from the first temperature characteristic, by converting the excitation light passing through the optical paths into wavelength converted light; a reference light measuring section for measuring the reference light; and a control section for controlling a temperature of the wavelength converting element based on the reference light measured by the reference light measuring section.

In the laser light source, the multiple optical paths along which the excitation light passes are formed in the wavelength converting element, and the temperature of the wavelength converting element is controlled by monitoring the reference light having the temperature characteristic different from the temperature characteristic of the output light serving as the wavelength converted light to be outputted to the exterior of the laser light source. Accordingly, the intensity of the reference light has a gradient at an element temperature where the intensity of the output light is maximized. Controlling the temperature of the wavelength converting element using the gradient enables to perform high-speed temperature control in the vicinity of the element temperature where the intensity of the output light is maximized. This enables to remarkably reduce output variation, which has conventionally occurred during a temperature control, and stabilize the output.

Preferably, the output light may have the first temperature characteristic that the output light has a maximum value at a first element temperature, the reference light may have the second temperature characteristic that the reference light has a maximum value at a second element temperature different from the first element temperature, and an intensity of the reference light may not be smaller than 15% and not larger than 85% of the maximum value of the reference light, and more preferably not be smaller than 30% and not larger than 60% of the maximum value of the reference light at an element temperature where an intensity of the output light becomes a maximum value.

In the former case, the S/N ratio becomes sufficiently large, and high-precision temperature control can be performed. In the latter case, since output variation of the reference light with respect to a temperature change becomes sufficiently large, high-speed temperature control can be performed, and output variation can be further reduced.

Preferably, the control section may store in advance an intensity of the reference light at an element temperature where an intensity of the output light becomes a maximum value, and adjust the temperature of the wavelength converting element in such a manner that an intensity of the reference light measured by the reference light measuring section coincides with the stored intensity of the reference light.

In the above arrangement, since the intensity of the reference light when the element temperature coincides with the phase matching temperature of the output light is stored in advance, and temperature adjustment is performed in such a manner that the reference light has the predetermined stored value, judgment as to whether the wavelength converting element should be heated or cooled can be promptly made by monitoring the output of the reference light. Accordingly, high-speed temperature control can be performed, high-efficient and stable wavelength conversion can be performed, and beam deterioration of the output light can be prevented.

Preferably, the control section may calculate a normalized wavelength conversion efficiency of the wavelength converting element based on the reference light measured by the reference light measuring section, and store in advance a normalized wavelength conversion efficiency at an element temperature where an intensity of the output light becomes a maximum value to adjust the temperature of the wavelength converting element in such a manner that the normalized wavelength conversion efficiency calculated based on the reference light measured by the reference light measuring section coincides with the stored normalized wavelength conversion efficiency.

In the above arrangement, the normalized wavelength conversion efficiency when the element temperature coincides with the phase matching temperature of the output light is stored in advance, and temperature adjustment is performed in such a manner that the normalized wavelength conversion efficiency has the predetermined stored value, judgment as to whether the wavelength converting element should be heated or cooled can be promptly made by monitoring the normalized wavelength conversion efficiency. Accordingly, high-speed temperature control can be performed, high-efficient and stable wavelength conversion can be performed, and beam deterioration of the output light can be prevented. Further, since an increase or a decrease in normalized wavelength conversion efficiency depends solely on the element temperature, without an influence of an increase or a decrease in excitation light input, temperature control can be performed with high precision.

Preferably, the reference light measuring section may include a first reference light measuring portion for measuring first reference light having a low-temperature-side shift temperature characteristic that the first reference light has a maximum value at a temperature lower than a first element temperature, and a second reference light measuring portion for measuring second reference light having a high-temperature-side shift temperature characteristic that the second reference light has a maximum value at a temperature higher than the first element temperature, and the control section may calculate an output ratio of the first reference light measured by the first reference light measuring portion and the second reference light measured by the second reference light measuring portion, and store in advance an output ratio of the first reference light and the second reference light at an element temperature where an intensity of the output light becomes a maximum value to adjust the temperature of the wavelength converting element in such a manner that the output ratio calculated based on the first reference light measured by the first reference light measuring portion and the second reference light measured by the second reference light measuring portion coincides with the stored output ratio.

In the above arrangement, the output ratio of the first reference light and the second reference light when the element temperature coincides with the phase matching temperature is stored in advance, and a control operation of increasing the temperature of the wavelength converting element in the case where the output ratio is larger than the predetermined stored value, and decreasing the temperature of the wavelength converting element in the case where the output ratio is smaller than the predetermined stored value can be performed. This enables to perform high-precision temperature control, even in the case where the wavelength conversion efficiency on an incoming path out of the multiple optical paths of the excitation light, or the output of excitation light that has not been subjected to wavelength conversion on the incoming path is varied.

Preferably, the laser light source may further include an output light measuring section for measuring a part of the output light, wherein the control section controls the excitation light source to make an intensity of the output light to be outputted to the exterior of the laser light source constant, based on the output light measured by the output light measuring section.

In the above arrangement, since the output constant control is performed based on the intensity of the output light, and the temperature control using the reference light is performed, the output can be constantly made stable, and the element temperature can be made constantly and substantially coincident with the phase matching temperature. This enables to prevent beam deterioration, which may occur in wavelength conversion at a temperature different from the phase matching temperature.

Preferably, the laser light source may further include an excitation light measuring section for measuring the excitation light to be emitted from the wavelength converting element.

In the above arrangement, since the output of excitation light on an outgoing path out of the multiple optical paths of the excitation light can be monitored by summing up the output of the measured excitation light, and the output of the measured reference light, the output constant control can be performed with high precision.

Preferably, the wavelength converting element may be a bulk type wavelength converting element.

In the above arrangement, influences of light absorption and temperature increase by the light absorption can be suppressed, and propagation loss in the wavelength converting element can be reduced by increasing the beam diameter.

Preferably, the wavelength converting element may also be a wavelength converting element having a slab waveguide path.

In the above arrangement, in the case where the intensity of the wavelength converted light is 10 W or less, it is easy to secure the intensity of excitation light on an outgoing path out of the multiple optical paths of the excitation light, and high wavelength conversion efficiency from the excitation light on the outgoing path into the wavelength converted light can be obtained. This enables to make the S/N ratio of the reference light sufficiently high.

Preferably, the wavelength converting element may be a quasi phase matching wavelength converting element.

In the above arrangement, it is possible to partially adjust the cycle of the cyclic polarization inversion structure, or partially form a portion where the cyclic polarization inversion structure is not formed. This enables to freely adjust the phase matching temperatures of the multiple reference light and the allowable temperature range.

Preferably, a polarization inversion cycle of the wavelength converting element on the optical path of the excitation light for generating the reference light may be different from a polarization inversion cycle on the optical path of the excitation light for generating the output light.

In the above arrangement, the output light and the reference light having the temperature characteristics different from each other can be easily generated.

Preferably, the wavelength converting element may be made of a non-linear optical crystal containing lithium niobate or lithium tantalate as a main component. This enables to perform high-efficient wavelength conversion.

A laser light source according to another aspect of the invention includes: an excitation light source; a wavelength converting element made of a non-linear optical crystal for converting excitation light from the excitation light source into wavelength converted light having a wavelength different from a wavelength of the excitation light; an output light measuring section for measuring a part of the wavelength converted light to be emitted from the wavelength converting element, as output light; and a control section for simultaneously performing an output constant control of controlling the excitation light source to make an intensity of the wavelength converted light constant based on the output light measured by the output light measuring section, and a temperature control of adjusting a temperature of the wavelength converting element to make the temperature of the wavelength converting element close to a phase matching temperature.

In the laser light source having the above arrangement, since the temperature control of making the temperature of the wavelength converting element close to the phase matching temperature is performed during the output constant control of feeding back the output of the wavelength converted light to the excitation light source, it is possible to eliminate a difference between the element temperature and the phase matching temperature without suspending the output constant control. In this arrangement, since unduly large variation in output is not generated, the temperature control can be frequently performed. This enables to constantly keep the high wavelength conversion efficiency, and reduce beam deterioration of the wavelength converted light, because wavelength conversion can be constantly performed at an optimal temperature. Further, in the case where a semiconductor laser is used as the excitation light source, a drive current to be supplied to the light source can be reduced, and lowering of the performance of the light source or shortening the life thereof can be suppressed.

Preferably, the control section may simultaneously perform the output constant control, and a temperature control of heating or cooling the wavelength converting element to minimize an intensity of the excitation light to be incident into the wavelength converting element.

In the above arrangement, since the temperature control of heating or cooling the wavelength converting element to minimize the intensity of the excitation light to be incident into the wavelength converting element is performed by monitoring the excitation light, the temperature of the wavelength converting element can be adjusted to make the temperature of the wavelength converting element close to the phase matching temperature, without suspending the output constant control of adjusting the input electric power to the excitation light source to make the intensity of the wavelength converted light constant.

Preferably, the control section may simultaneously perform the output constant control, and a temperature control of heating or cooling the wavelength converting element to maximize a normalized wavelength conversion efficiency of the wavelength converting element.

In the above arrangement, since the temperature control of heating or cooling the wavelength converting element is performed to maximize the normalized wavelength conversion efficiency, the temperature of the wavelength converting element can be adjusted to make the temperature of the wavelength converting element close to the phase matching temperature, without suspending the output constant control of adjusting the input electric power to the excitation light source to make the intensity of the wavelength converted light constant. Further, since an increase or a decrease in normalized wavelength conversion efficiency depends solely on the element temperature without an influence of an increase or a decrease in excitation light input, temperature control can be performed with high precision.

Preferably, the control section may simultaneously perform the output constant control, and a temperature control of heating or cooling the wavelength converting element to minimize an intensity of the excitation light to be emitted from the wavelength converting element.

In the above arrangement, since the temperature control of heating or cooling the wavelength converting element is performed to minimize the intensity of the excitation light to be emitted from the wavelength converting element, the temperature of the wavelength converting element can be adjusted to make the temperature of the wavelength converting element close to the phase matching temperature, without suspending the output constant control of adjusting the input electric power to the excitation light source to make the intensity of the wavelength converted light constant.

Preferably, the control section may simultaneously perform the output constant control, and a temperature control of heating or cooling the wavelength converting element to minimize an input electric power to the excitation light source.

In the above arrangement, since the temperature control of heating or cooling the wavelength converting element is performed to minimize the input electric power to the excitation light source, the temperature of the wavelength converting element can be adjusted to make the temperature of the wavelength converting element close to the phase matching temperature, without suspending the output constant control of adjusting the input electric power to the excitation light source to make the intensity of the wavelength converted light constant.

Preferably, the control section may store in advance a value to be used in control, out of an intensity of the excitation light to be incident into the wavelength converting element, a normalized wavelength conversion efficiency of the wavelength converting element, an intensity of the excitation light to be emitted from the wavelength converting element, and an input electric power to the excitation light source, where intended wavelength converted light is obtained, when the temperature of the wavelength converting element coincides with the phase matching temperature.

In the above arrangement, since the temperature adjustment can be performed to make the control value coincident with the predetermined stored value, high-speed temperature control can be performed.

Preferably, the control section may switch from the temperature control to a temperature constant control of controlling the temperature of the wavelength converting element constant, in the case where one of an intensity of the excitation light to be incident into the wavelength converting element, a normalized wavelength conversion efficiency of the wavelength converting element, an intensity of the excitation light to be emitted from the wavelength converting element, and an input electric power to the excitation light source satisfies a predetermined threshold value condition.

In the above arrangement, it is possible to reduce a load to the control section required in the temperature constant control during the temperature constant control.

Preferably, the control section may perform the control, with an input electric power to the excitation light source having an upper limit.

In the above arrangement, deterioration of the excitation light source can be prevented, and the life of the excitation light source can be extended.

Preferably, the wavelength converting element may be a non-linear optical crystal formed with a cyclic polarization inversion structure, and a phase matching temperature of the wavelength converting element may be higher than an environment temperature.

In the above arrangement, there is no need of providing a cooling function in the wavelength converting element in a normal temperature environment, and an inexpensive heater or a like device can be used as a heating/cooling member for the wavelength converting element.

Preferably, $M^2$ of laser light to be emitted from the laser light source may be 1.4 or less.

In the above arrangement, since laser light having an excellent beam quality can be obtained, a laser light source suitable for laser processing can be realized.

An image display apparatus according to yet another aspect of the invention includes: multiple laser light sources; a spatial modulator; and an optical system for guiding light to be emitted from the laser light sources to the spatial modulator, wherein the laser light sources include at least a red laser light source, a green laser light source, and a blue laser light source, and at least the green laser light source out of the laser light sources is the laser light source recited in any one of the above arrangements.

An image display apparatus according to yet another aspect of the invention includes: multiple laser light sources; a scanning section; and an optical system for guiding light to be emitted from the laser light sources to the scanning section, wherein the scanning section scans light from the laser light sources guided by the optical system, the laser light sources include at least a red laser light source, a green laser light source, and a blue laser light source, and at least the green laser light source out of the laser light sources is the laser light source recited in any one of the above arrangements.

In the above image display apparatuses, since the laser light sources for performing the above control are used for displaying an image, an image display apparatus with less variation in white balance and low electric power consumption can be realized.

A processing apparatus according to still another aspect of the invention includes: a laser light source; and an optical system for guiding laser light to be emitted from the laser light source onto an object to be processed, wherein the laser light source is the laser light source recited in any one of the above arrangements.

In the processing apparatus, since the laser light sources for performing the above control are used, laser light with stable output and high beam quality can be generated, and laser processing such as laser marking or laser peening can be performed.

Preferably, a wavelength of the laser light to be generated from the laser light source may be not shorter than 441 nm and not longer than 592 nm.

In the above arrangement, since water vaporization resulting from water absorption by laser light can be prevented, a high laser peening effect can be secured on an irradiation surface of an object to be processed.

Since the inventive laser light source enables to stabilize the output and provide high efficiency in a laser light source incorporated with a wavelength converting element, the laser light source is capable of stably outputting light of a wavelength in a visible region from 0.5 μm to 0.6 μm, and a wavelength in a mid infrared region of 2 μm or more, and accordingly, can be applied in various fields such as medical apparatuses, processing apparatuses, and display apparatuses.

The invention claimed is:

1. A laser light source, comprising:
an excitation light source;
a wavelength converting element made of a non-linear optical crystal and having multiple optical paths along which excitation light from the excitation light source passes, the wavelength converting element generating output light having a first temperature characteristic and adapted to be emitted to the exterior of the laser light source and reference light having a second temperature characteristic different from the first temperature characteristic, by converting the excitation light passing through the optical paths into wavelength converted light;
a reference light measuring section for measuring the reference light; and
a control section for controlling a temperature of the wavelength converting element based on the reference light measured by the reference light measuring section,
wherein the wavelength converting element includes a cyclic polarization inversion structure, and
a polarization inversion cycle of the cyclic polarization inversion structure on the optical path of the excitation light for generating the reference light is different from a polarization inversion cycle on the optical path of the excitation light for generating the output light.

2. The laser light source according to claim 1, wherein
the first temperature characteristic of the output light is that the output light has a maximum value at a first element temperature,
the second temperature characteristic of the reference light is that the reference light has a maximum value at a second element temperature different from the first element temperature, and
an intensity of the reference light is not smaller than 15% and not larger than 85% of the maximum value of the reference light at an element temperature where an intensity of the output light is a maximum value.

3. The laser light source according to claim 1, wherein
the control section stores in advance an intensity of the reference light at an element temperature where an intensity of the output light is a maximum value, and adjusts the temperature of the wavelength converting element such that an intensity of the reference light measured by the reference light measuring section coincides with the stored intensity of the reference light.

4. The laser light source according to claim 1, wherein
the control section calculates a normalized wavelength conversion efficiency of the wavelength converting element based on the reference light measured by the reference light measuring section, and stores in advance a normalized wavelength conversion efficiency at an element temperature where an intensity of the output light is a maximum value in order to adjust the temperature of the wavelength converting element such that the normalized wavelength conversion efficiency calculated based on the reference light measured by the reference light measuring section coincides with the stored normalized wavelength conversion efficiency.

5. The laser light source according to claim 1, wherein
the reference light measuring section includes:
a first reference light measuring portion for measuring a first reference light having a low-temperature-side shift temperature characteristic such that the first reference light has a maximum value at a temperature lower than a first element temperature, and
a second reference light measuring portion for measuring a second reference light having a high-temperature-side shift temperature characteristic such that the second reference light has a maximum value at a temperature higher than the first element temperature, and
the control section calculates an output ratio of the first reference light measured by the first reference light measuring portion and the second reference light measured by the second reference light measuring portion, and stores in advance an output ratio of the first reference light and the second reference light at an element temperature where an intensity of the output light is a maximum value to adjust the temperature of the wavelength converting element such that the output ratio calculated based on the first reference light measured by the first reference light measuring portion and the second reference light measured by the second reference light measuring portion coincides with the stored output ratio.

6. The laser light source according to claim 1, further comprising:
an output light measuring section for measuring a part of the output light, wherein
the control section controls the excitation light source so that an intensity of the output light to be outputted to the exterior of the laser light source remains constant, based on the output light measured by the output light measuring section.

7. The laser light source according to claim 6, further comprising:
an excitation light measuring section for measuring the excitation light to be emitted from the wavelength converting element.

8. The laser light source according to claim 1, wherein
the wavelength converting element is a bulk type wavelength converting element.

9. The laser light source according to claim 1, wherein
the wavelength converting element is a wavelength converting element having a slab waveguide path.

10. The laser light source according to claim 1, wherein
the wavelength converting element is a quasi phase matching wavelength converting element.

11. The laser light source according to claim 1, wherein
the wavelength converting element is a non-linear optical crystal formed with a cyclic polarization inversion structure, and
a phase matching temperature of the wavelength converting element is higher than an environment temperature.

12. The laser light source according to claim 1, wherein $M^2$ of laser light to be emitted from the laser light source is 1.4 or less.

13. An image display apparatus comprising:
multiple laser light sources;
a spatial modulator; and
an optical system for guiding light to be emitted from the multiple laser light sources to the spatial modulator, wherein
the multiple laser light sources include at least a red laser light source, a green laser light source, and a blue laser light source, and
at least the green laser light source out of the multiple laser light sources is the laser light source recited in claim 1.

14. An image display apparatus comprising:
multiple laser light sources;
a scanning section; and
an optical system for guiding light to be emitted from the multiple laser light sources to the scanning section, wherein
the scanning section scans light from the multiple laser light sources guided by the optical system,
the multiple laser light sources include at least a red laser light source, a green laser light source, and a blue laser light source, and
at least the green laser light source out of the multiple laser light sources is the laser light source recited in claim 1.

15. A processing apparatus comprising:
a laser light source; and
an optical system for guiding laser light to be emitted from the laser light source onto an object to be processed, wherein
the laser light source is the laser light source recited in claim 1.

16. The processing apparatus according to claim 15, wherein
a wavelength of the laser light to be generated from the laser light source is not shorter than 441 nm and not longer than 592 nm.

* * * * *